US011900868B2

(12) United States Patent
Zhang

(10) Patent No.: US 11,900,868 B2
(45) Date of Patent: Feb. 13, 2024

(54) DISPLAY PANEL AND DISPLAY DEVICE

(71) Applicant: Wuhan Tianma Microelectronics Co., Ltd., Wuhan (CN)

(72) Inventor: Dian Zhang, Wuhan (CN)

(73) Assignee: Wuhan Tianma Microelectronics Co., Ltd., Wuhan (CN)

( * ) Notice: Subject to any disclaimer, the term of this patent is extended or adjusted under 35 U.S.C. 154(b) by 0 days.

(21) Appl. No.: 18/136,441

(22) Filed: Apr. 19, 2023

(65) Prior Publication Data

US 2023/0260450 A1 Aug. 17, 2023

(30) Foreign Application Priority Data

Nov. 25, 2022 (CN) ........................ 202211493211.4

(51) Int. Cl.
*G09G 3/32* (2016.01)

(52) U.S. Cl.
CPC ....... *G09G 3/32* (2013.01); *G09G 2310/0267* (2013.01); *G09G 2310/0275* (2013.01); *G09G 2310/0286* (2013.01); *G09G 2310/0297* (2013.01); *G09G 2310/08* (2013.01)

(58) Field of Classification Search
CPC ....... G09G 2310/0297; G09G 2310/08; G09G 2310/027; G09G 2310/0262; G09G 3/3233; G09G 3/20; G09G 3/3688; G09G 3/3275; G09G 3/3648; G09G 3/3208; G09G 3/3291; G09G 2300/0426; G09G 2300/0819; G09G 2300/0861; G09G 2300/0452; G09G 2320/0233; G09G 2320/043
See application file for complete search history.

(56) References Cited

U.S. PATENT DOCUMENTS

| | | | | |
|---|---|---|---|---|
| 2021/0065636 A1* | 3/2021 | Shan | ..................... | G09G 3/3233 |
| 2022/0189378 A1* | 6/2022 | Dong | ........................ | G09G 3/20 |
| 2023/0024029 A1* | 1/2023 | Yu | ........................ | G09G 3/3291 |
| 2023/0165076 A1* | 5/2023 | Han | .......................... | G09G 3/32 257/72 |

FOREIGN PATENT DOCUMENTS

CN 111292665 A 6/2020

* cited by examiner

*Primary Examiner* — Dong Hui Liang
(74) *Attorney, Agent, or Firm* — KDW Firm PLLC

(57) ABSTRACT

Provided are a display panel and a display device. The display panel includes multiple pixel units, multiple scan lines, multiple data lines, a multiplexer and h control signal lines. In a same data write stage of the display panel, during a first stage, data signals are written into the multiple data lines at an enable duration of a j-th control signal, during a second stage, a first scan enable voltage edge of an i-th scan signal is located behind a first control enable voltage edge of the j-th control signal, and the data signals on the multiple data lines are written into the multiple pixel units; and a second scan enable voltage edge of the i-th scan signal in a m-th data write stage is located before a second control enable voltage edge of an n-th control signal in a (m+1)-th data write stage.

20 Claims, 21 Drawing Sheets

DISPLAY PANEL AND DISPLAY DEVICE

CROSS-REFERENCE TO RELATED APPLICATION(S)

This application claims priority to Chinese Patent Application No. 202211493211.4 filed Nov. 25, 2022, the disclosure of which is incorporated herein by reference in its entirety.

TECHNICAL FIELD

Embodiments of the present disclosure relate to the field of display technologies, and in particular to, a display panel and a display device.

BACKGROUND

With the rapid development of display technologies, people have increasingly high requirements for the quality of display panels. However, FIG. 1 is a schematic diagram of a display image of an existing display panel, and as shown in FIG. 1, an image displayed by the display panel includes both a white screen and a black screen, when the white screen is switched to the black screen, a black line generally appears between two black screens, which may refer to a region at an upper dotted circle in FIG. 1, and when the black screen is switched to the white screen, a bright line generally appears between the two black screens, which may refer to a region at a lower dotted circle in FIG. 1. Therefore, the display effect of the display panel is poor, and thus the display quality of a display device is reduced.

SUMMARY

The present disclosure provides a display panel and a display device, so as to solve a problem that a black line or a bright line appears at the junction of a black picture and a white picture of the display device and improve the display quality of the display device.

In a first aspect, an embodiment of the present disclosure provides a display panel. The display panel includes multiple pixel units, multiple scan lines, multiple data lines, a multiplexer and h control signal lines. The multiple scan lines include an i-th scan line, the i-th scan line is configured to transmit an i-th scan signal to pixel units arranged in a row along a first direction, the i-th scan signal includes a first scan enable voltage edge and a second scan enable voltage edge in sequence, a time duration between the first scan enable voltage edge and the second scan enable voltage edge is an enable duration of the i-th scan signal, where i is a positive integer. The multiple data lines are configured to transmit data signals to pixel units arranged in a column along a second direction, and include first data lines and second data lines, the first data lines are electrically connected to pixel units of odd-numbered rows in a column of pixel units among the multiple pixel units, the second data lines are electrically connected to pixel units of even-numbered rows in a column of pixel units among the multiple pixel units, and the first direction intersects with the second direction. The multiplexer includes multiple selector output terminals and multiple selector control terminals, and each of the multiple selector output terminals is electrically connected to a respective one of the multiple data lines. Each of the h control signal lines is electrically connected to a respective one of the multiple selector control terminals, and the h control signal lines include a j-th control signal line, the j-th control signal line is configured to transmit a j-th control signal, the j-th control signal includes a first control enable voltage edge and a second control enable voltage edge in sequence, a time duration between the first control enable voltage edge and the second control enable voltage edge is an enable duration of the j-th control signal, where $1 \leq j \leq h$, and j and h are positive integers. A drive timing of the display panel includes a data write stage, and the data write stage includes a first stage and a second stage.

In a same data write stage, during the first stage, the data signals are written into the multiple data lines at the enable duration of the j-th control signal, during the second stage, the first scan enable voltage edge of the i-th scan signal is located behind the first control enable voltage edge of the j-th control signal, and the data signals on the multiple data lines are written into the multiple pixel units. The second scan enable voltage edge of the i-th scan signal in a m-th data write stage is located before a second control enable voltage edge of an n-th control signal in a (m+1)-th data write stage, where $|n-j| \leq h$, $1 \leq n \leq h$, and m and n are positive integers.

In a second aspect, an embodiment of the present disclosure further provides a display device including the display panel described in the first aspect.

BRIEF DESCRIPTION OF DRAWINGS

In order to more clearly explain technical schemes in embodiments of the present disclosure or in a related art, the drawings used for describing the embodiments or the related art will be briefly introduced below. Obviously, the drawings in the following description are some specific embodiments of the present disclosure. For those skilled in the art, underlying concepts of a device structure, a driving method and a manufacturing method as disclosed and suggested by the embodiments of the present disclosure may be expanded and extended to other structures and drawings, needless to say that these should be within the scope of the claims of the present disclosure.

DETAILED DESCRIPTION

In order to make the purposes, technical schemes and advantages of the present disclosure more clear, technical schemes of the present disclosure will be described clearly and completely through the implementation in conjunction with the drawings in embodiments of the present disclosure. Apparently, the described embodiments are merely part of the embodiments of the present disclosure, rather than all of the embodiments of the present disclosure. All other embodiments, which may be obtained by those skilled in the art based on the basic idea disclosed and suggested by the embodiments of the present disclosure, shall all fall within the scope of protection of the present disclosure.

Figure 1:
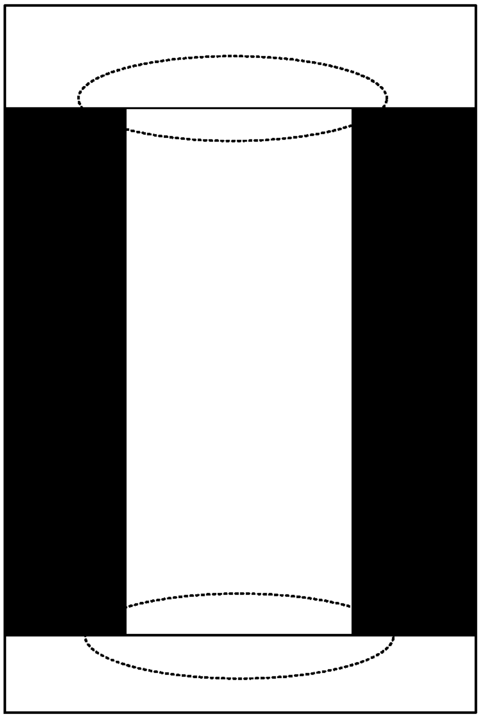
FIG. 1 is a schematic diagram of a display image of an existing display panel.
Figure 2:
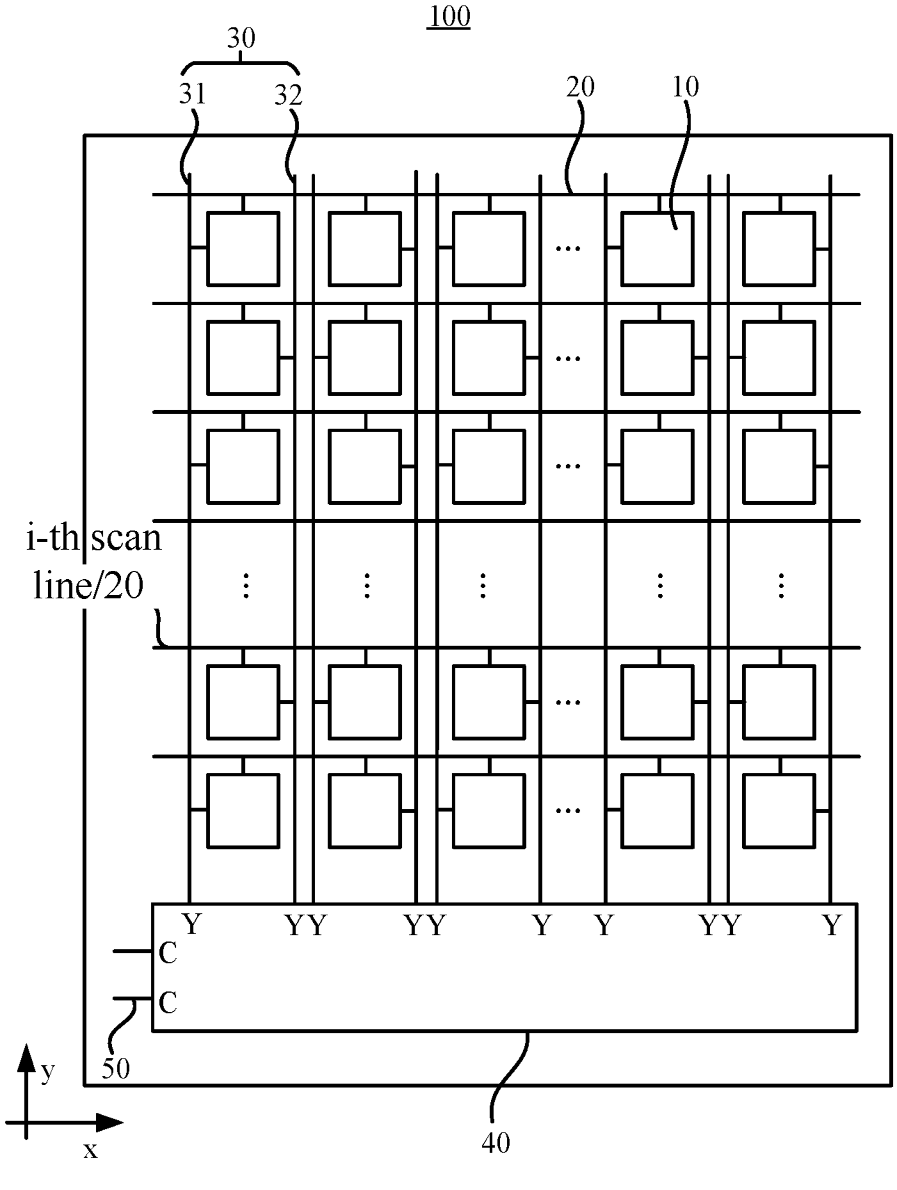
FIG. 2 is a schematic structural diagram of a display panel according to an embodiment of the present disclosure.
Figure 3:
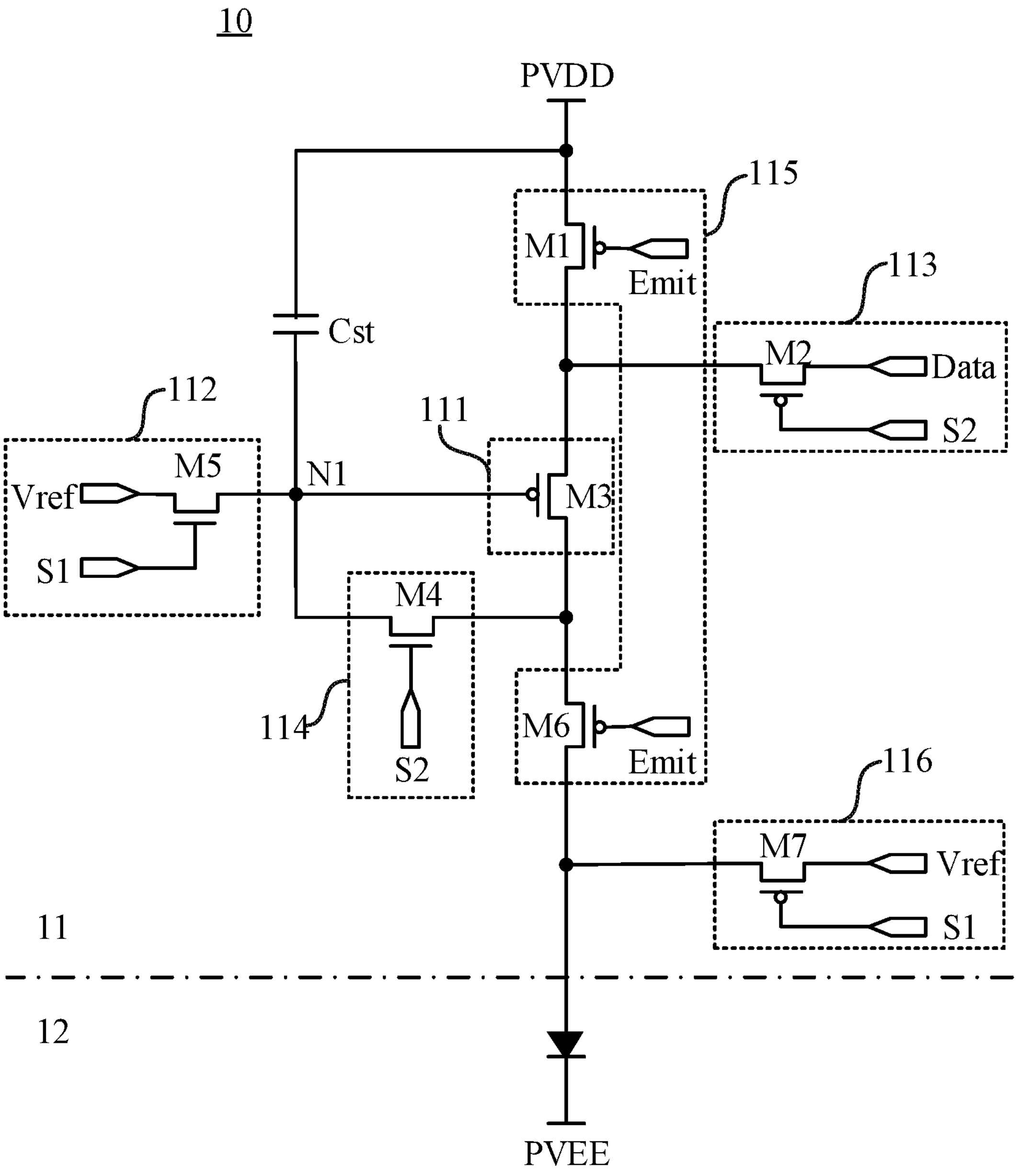
FIG. 3 is a schematic structural diagram of a pixel unit according to an embodiment of the present disclosure.
Figure 4:
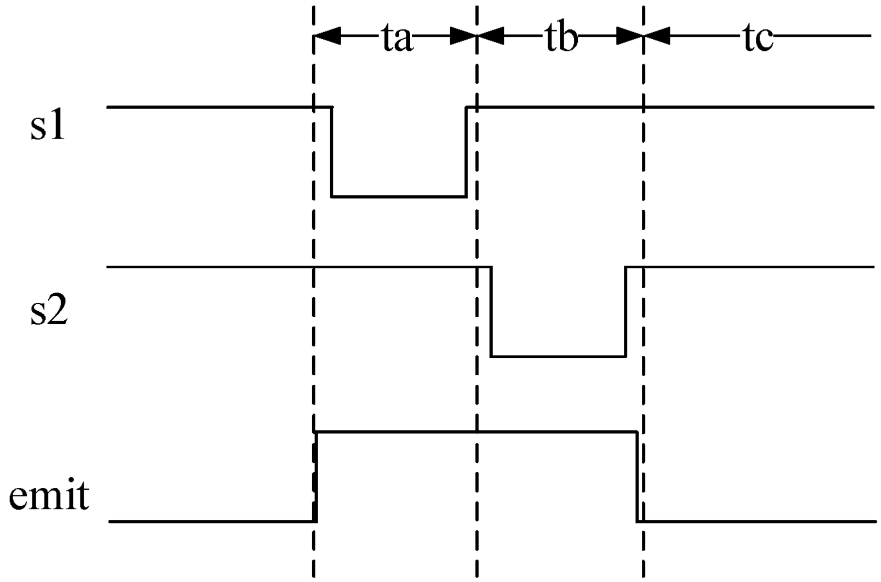
FIG. 4 is a drive timing diagram of FIG. 3.

FIG. 2 is a schematic structural diagram of a display panel according to an embodiment of the present disclosure, FIG. 3 is a schematic structural diagram of a pixel unit according to an embodiment of the present disclosure, and referring to FIGS. 2 and 3, a display panel 100 includes multiple pixel units 10. The pixel unit 10 generally includes a pixel driving circuit 11 and a light-emitting element 12 electrically connected to each other, referring to FIG. 3, the pixel driving circuit 11 may be an existing 7T1C circuit, that is, the pixel driving circuit 11 includes a drive module 111, an initialization module 112, a data write module 113, a threshold compensation module 114, a light emission control module 115, a reset module 116, and a storage capacitor Cst, but is not limited thereto. A cathode of the light-emitting element 12 may receive a negative voltage signal PVEE, and as such, the drive module 111 in the pixel driving circuit 11 may drive the light-emitting element 12 to emit light under the action of a power signal PVDD (such as, a positive voltage signal) provided at a power signal terminal and a data signal written by the drive module, so as to cause the display panel 100 to present a corresponding display image.

Figure 6:
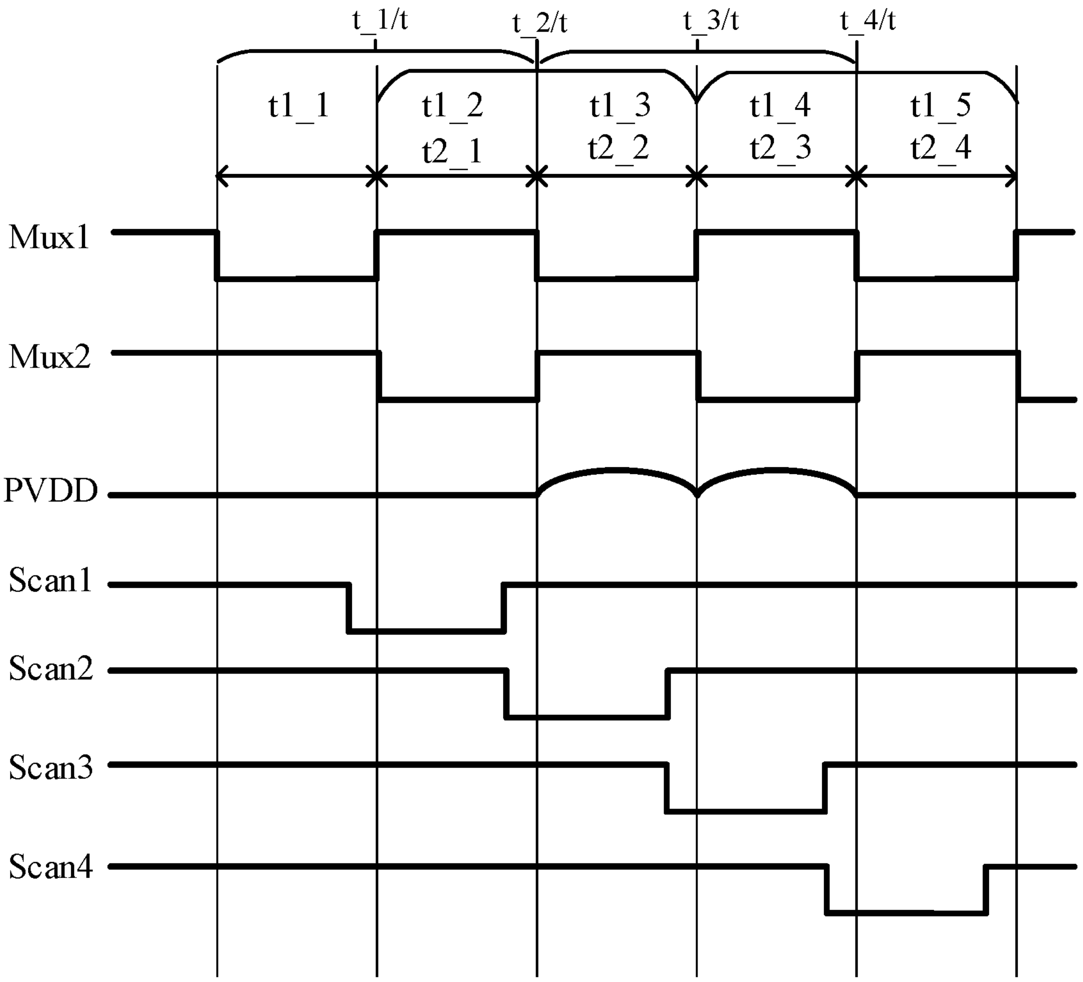
FIG. 6 is a drive timing diagram of a display panel according to an embodiment of the present disclosure.

In an embodiment, FIG. 3 shows that in the pixel driving circuit 11, the drive module 111 includes a third transistor M3, the initialization module 112 includes a fifth transistor M5, the data write module 113 includes a second transistor M2, the threshold compensation module 114 includes a fourth transistor M4, the light emission control module 115 includes a first transistor M1 and a sixth transistor M6, the reset module 116 includes a seventh transistor M7, where a gate of the fifth transistor M5 and a gate of the seventh transistor M7 are each connected to a scan signal terminal S1, a gate of the second transistor M2 and a gate of the fourth transistor M4 are each connected to a scan signal terminal S2, and a gate of the first transistor M1 and a gate of the sixth transistor M6 are each connected to a light emitting control terminal Emit. All of the transistors being adopting P-channel transistors is used as an example in FIG. 3, the transistors are turned off when a scan signal provided to the gates thereof is at a high level, and are turned on when the scan signal is at a low level. FIG. 6 is a drive timing diagram of FIG. 3, and with combined reference to FIG. 3 and FIG. 6, a drive timing of the pixel unit 10 may include an initialization stage ta, a data write stage tb (i.e., a data write stage t described below), and a light emission stage tc.

In the initialization stage ta, a scan signal s1 provided by the scan signal terminal S1 jumps from the high level to the low level, at this time, the fifth transistor M5 is turned on and the reset signal Vref is written into a first node N1. At the same time, the seventh transistor M7 is turned on, and the reset signal Vref is written into an anode of the light-emitting element 12 to avoid influence of a voltage signal written in the previous frame.

In the data write stage tb, a scan signal s2 provided by the scan signal terminal S2 jumps from the high level to the low level, at this time, the second transistor M2 and the fourth transistor M4 are turned on, and a data signal Vdata provided by a data terminal Data flows into the first node N1 through the second transistor M2, the third transistor M3 and the fourth transistor M4 in sequence.

In the light emission stage tc, a light emission control signal emit provided by a light emission control signal terminal Emit jumps from the high level to the low level, at this time, the first transistor M1 and the sixth transistor M6 are turned on, a path is formed between a positive power signal terminal PVDD and a negative power signal terminal PVEE, to drive the light-emitting element 12 to emit light.

With continued reference to FIG. 2, the multiple scan lines 20 includes an i-th scan line, the i-th scan line is configured to transmit an i-th scan signal Scani to pixel units 10 arranged in a row along a first direction x. With combined reference to FIGS. 2 and 3, it should be understood that the i-th scan signal Scani may be the scan signal s2 that controls the pixel driving circuit 11 to write a data signal into the drive module 111 (i.e., the gate of the third transistor M3) in a data write stage t2, as such, after the i-th scan signal Scani controls that all transistors in a data write path of the pixel unit 10 electrically connected to the scan line 20 are turned off, a data signal provided by data lines 30 is caused to be written into the first node N1 of the pixel driving circuit 11 in the pixel unit 10, whereby the light-emitting element 12 in the pixel unit 10 is enabled to perform a light-emitting display according to the written data signal and the power signal PVDD during the light emission stage. The i-th scan signal Scani includes a first scan enable voltage edge and a second scan enable voltage edge in sequence, a time duration between the first scan enable voltage edge and the second scan enable voltage edge is an enable duration of the i-th scan signal Scani, where i is a positive integer. It should be understood that the enable duration of the i-th scan signal Scani refers to a stage in which the i-th scan signal Scani transmitted by the i-th scan line is an enable signal, in this stage, all transistors in a data write path of all pixel units 10 electrically connected to the i-th scan line are turned off, and the data signal may be written into the pixel driving circuit 11 of the pixel unit 10. Conversely, when the i-th scan signal Scani transmitted by the i-th scan line is a non-enable signal, then transistors of all pixel units 10 electrically connected to the i-th scan line are turned on. Where an enable signal corresponding to the enable duration of the i-th scan signal Scani may be either a low level signal or a high level signal, which is not specifically limited in the embodiments of the present disclosure and may be set according to actual requirements. Correspondingly, the first scan enable voltage edge may be a voltage edge at which the i-th scan signal Scani jumps from the non-enable signal to the enable signal, and the second scan enable voltage edge may be a voltage edge at which the i-th scan signal Scani jumps from the enable signal to the non-enable signal.

In an embodiment, the enable signal corresponding to the enable duration of the i-th scan signal Scani is the low level signal, the non-enable signal corresponding to the enable duration of the i-th scan signal Scani is the high level signal, then the first scan enable voltage edge is a falling edge at which the i-th scan signal Scani jumps from the high level signal to the low level signal, and the second scan enable voltage edge is a rising edge at which the i-th scan signal Scani jumps from the low level signal to the high level signal.

With continued reference to FIG. 2, the multiple data lines 30 are configured to transmit data signals to pixel units 10 arranged in a column along a second direction y. The multiple data lines 30 includes first data lines 31 and second data lines 32, where the first data lines 31 are electrically connected to pixel units 10 of odd-numbered rows in a column of pixel units 10, the second data lines 32 are electrically connected to pixel units 10 of even-numbered rows in a column of pixel units 10, and the first direction x intersects with the second direction y. A column of pixel units 10 arranged in the second direction y in the display panel 100 includes the pixel units 10 of the odd-numbered rows and the pixel units 10 of the even-numbered rows. The first data lines 31 are electrically connected to the pixel units 10 of the odd-numbered rows in the column of pixel units 10, so that when a scan signal transmitted from the scan line 20 drives the pixel units 10 of the odd-numbered rows, the pixel units 10 will perform the light-emitting display according to a data signal transmitted from the first data lines 31. The second data lines 32 are electrically connected to the pixel units 10 of the even-numbered rows in the column of pixel units 10, so that when the scan signal transmitted from the scan line 20 drives the pixel units 10 of the even-numbered rows, the pixel units 10 will perform the light-emitting display according to a data signal transmitted from the second data lines 32. It should be noted that specific arrangement positions of the first data line 31 and the second data line 32 may be set according to actual requirements, for example, the first data line 31 and the second data line 32 electrically connected to a same column of pixel units 10 may be located on a same side of the column of pixel units 10, or on two sides of the column of pixel units 10, which is not specifically limited in the embodiments of the present disclosure and is shown in FIG. 2.

With continued reference to FIG. 2, a multiplexer 40 includes multiple selector output terminals Y and multiple selector control terminals C, each of the multiple selector output terminals Y is electrically connected to a respective one of the data lines 30. A number of selector control terminals C may be 2, 4 or more, which is not specifically limited in the embodiments of the present disclosure. The multiplexer 40 may, under the control of the multiple selector control terminals C, gate the selector output terminals Y, so as to write a data signal into the data line 30, charge the data line 30, and write the data signal on the data line 30 into the pixel driving circuit 11 of the pixel unit 10 to drive the light-emitting element 12 of the pixel unit 10 for the light-emitting display when a corresponding transistor in the pixel unit 10 electrically connected to the data line 30 is turned off.

The display panel 100 further includes h control signal lines 50, and each of the h control signal lines 50 is electrically connected to a respective one of the multiple selector control terminals C. The display panel 100 includes a j-th control signal line 50, the j-th control signal line 50 is configured to transmit a j-th control signal Muxj, and the j-th control signal Muxj may control the multiplexer 40 to gate the selector output terminal Y to write a data signal into the data line 30. The j-th control signal Muxj includes a first control enable voltage edge and a second control enable voltage edge in sequence, a time duration between the first control enable voltage edge and the second control enable voltage edge is an enable duration of the j-th control signal Muxj, where $1 \le j \le h$, and j and h are positive integers. It should be understood that the enable duration of the j-th control signal Muxj refers to a stage in which the j-th control signal Muxj transmitted by the j-th control signal line is an enable signal, at this stage, the j-th control signal line may gate a respective one of the selector output terminals Y to write a data signal into the data line 30, whereas when the j-th control signal Muxj transmitted by the j-th control signal line is a non-enable signal, then a selector output terminal Y corresponding to the j-th control signal line cannot write a data signal into the data line 30. An enable signal corresponding to the enable duration of the j-th control signal Muxj may be either the low level signal or the high level signal, which is not specifically limited in the embodiments of the present disclosure and may be set according to actual requirements. Correspondingly, the first control enable voltage edge may be a voltage edge at which the j-th control signal Muxj jumps from the non-enable signal to the enable signal, and the second control enable voltage edge may be a voltage edge at which the j-th control signal Muxj jumps from the enable signal to the non-enable signal.

In an embodiment, the enable signal corresponding to the enable duration of the j-th control signal Muxj is the low level signal, the non-enable signal corresponding to the enable duration of the j-th control signal Muxj is the high level signal, then the first control enable voltage edge is a falling edge at which the j-th control signal Muxj jumps from the high level signal to the low level signal, and the second control enable voltage edge is a rising edge at which the j-th control signal Muxj jumps from the low level signal to the high level signal.

Since power supply lines of the power signal PVDD provided for a proper operation of the pixel unit 10 are generally grid-like disposed entirely within the display panel, and are vulnerable to interference from other signal lines, whereby the power signal PVDD is caused to fluctuate, when a fluctuation signal of the power signal PVDD overlaps with an enable signal of other signal lines in timing, it is easy to have a coupling effect on other signals, for example, on an enable signal of the i-th scan signal Scani transmitted by the i-th scan line or on an enable signal of the j-th control signal Muxj transmitted by the j-th control signal line, thereby affecting data signal finally written into the pixel unit 10, and further affecting the normal light-emitting display of the display pixel unit 10.

Figure 5:
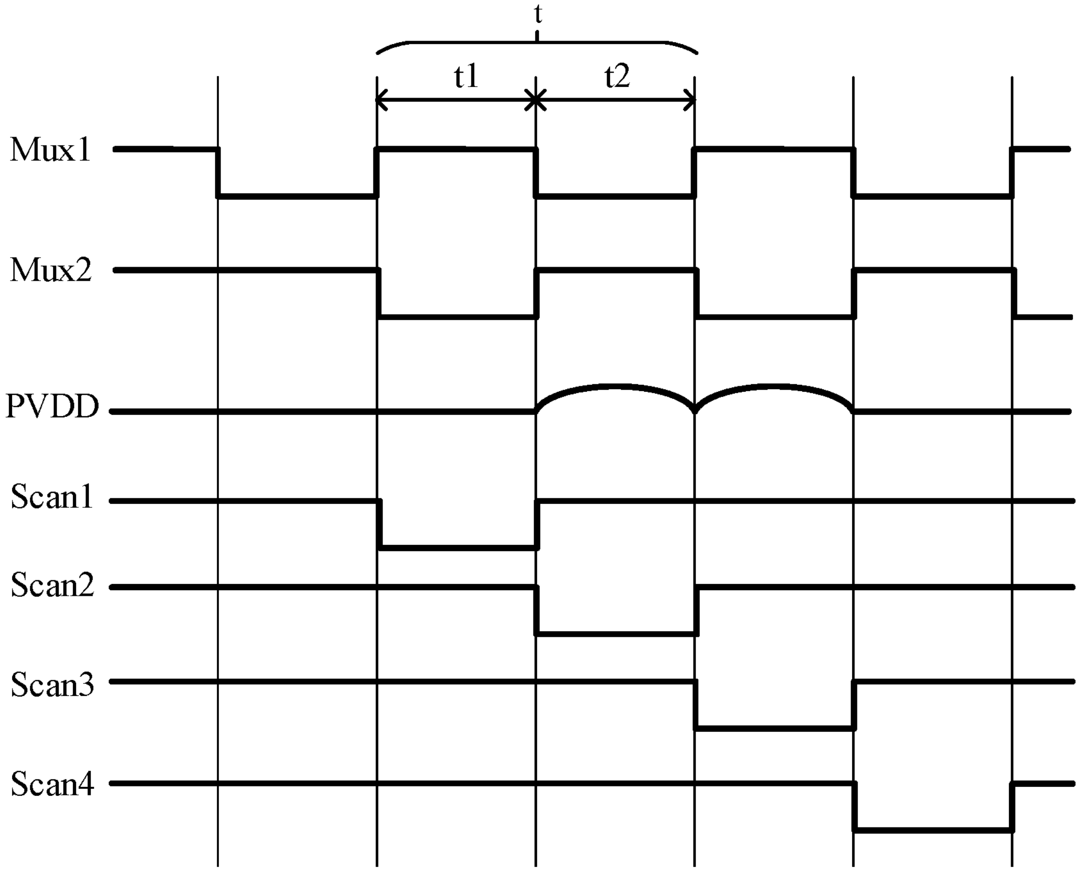
FIG. 5 is a drive timing diagram of an existing display panel according to an embodiment of the present disclosure.

FIG. 5 is a drive timing diagram of an existing display panel according to an embodiment of the present disclosure, and as shown in FIGS. 2 to 5, the display panel 100 including 2 control signal lines 50 is used as an example in FIG. 2, FIG. 5 shows a timing diagram of a first control signal Mux1, a second control signal Mux2, a first scan signal Scan1, a second scan signal Scan2, a third scan signal Scan3, a fourth scan signal Scan4, and a power signal PVDD, and an enable signal corresponding to the enable duration of the j-th control signal Muxj and an enable signal corresponding to the enable duration of the i-th scan signal Scan i being both low level signals, and a non-enable signal corresponding to the enable duration of the j-th control signal Muxj and a non-enable signal corresponding to the enable duration of the i-th scan signal Scan being both high level signals are used as an example. Referring to FIG. 2 and FIG. 5, for the pixel unit 10 electrically connected to the second scan line 20, its corresponding data write stage t includes a first stage t1 and a second stage t2, the first stage t1 includes an enable duration of the second control signal Mux2, the multiplexer 40 may be enabled to gate the data line 30 electrically connected to a second row of pixel units 10 under the control of the second control signal Mux2, to write a data signal into the data line 30 and charge the data line 30, and thus the first stage t1 may be considered as a data line charging stage. In the second stage t2, an enable duration including the second scan signal Scan2 may control all transistors on a data write path of the pixel driving circuit 11 in the second row of pixel units 10 to be turned off, and at this time, the data signal on the data line 30 is continuously written into the first node N1 in the pixel driving circuit 11 of the pixel unit 10, so that the pixel driving circuit 11 in the pixel unit 10 may drive the light-emitting element 12 to perform a light-emitting display according to the written data signal, and thus, the second stage t2 may be considered as a pixel unit charging stage, and as may be understood, the pixel unit is charged, that is, the data signal is written into the first node N1 in the pixel driving circuit 11. Due to the fluctuation of the power signal PVDD in the second stage t2, the data signal written into the pixel unit 10 by the data line 30 will be affected, and further the normal light-emitting display of the pixel unit 10 will be affected.

Based on the same analysis, with continued reference to FIG. 5, i=3 is used as an example, for the pixel unit 10 electrically connected to the third scan line 20, in a first stage of its corresponding data write stage, the multiplexer 40 may be enabled to gate the data line 30 electrically connected to a third row of pixel units 10 under the control of the first control signal Mux1, to write a data signal into the data line 30 and charge the data line 30, and at this time, the data signal written to the data line 30 will be affected due to fluctuations in the power signal PVDD. Further, in the second stage, the third scan signal Scan3 controls corresponding transistors in the third row of pixel units 10 to be turned off, and at this time, an abnormal data signal on the data line 30 continues to be written into the pixel unit 10, and becomes more abnormal under the coupling effect of the power signal PVDD, so that the pixel unit 10 has an abnormal light-emitting display, and further the display effect of the display panel 100 is affected. Moreover, since there is no overlap between the time duration of the fluctuation of the power signal PVDD and the data write stage of the pixel unit 10 electrically connected to the first scan line 20, the normal light-emitting display of a 1st row of pixel units 10 is not affected, which is not described in detail here.

Based on this, according to the embodiments of the present disclosure, in a same data write stage, during the first stage, the data signals are written into the data lines at the enable duration of the j-th control signal, and during the second stage, the first scan enable voltage edge of the i-th scan signal is located behind the first control enable voltage edge of the j-th control signal, and the data signals on the data lines are written into the pixel units. The second scan enable voltage edge of the i-th scan signal in a m-th data write stage is located before a second control enable voltage edge of an n-th control signal in a (m+1)-th data write stage, where |n−j|<h, 1≤n≤h, and m and n are positive integers.

In an embodiment, FIG. 6 is a drive timing diagram of a display panel according to an embodiment of the present disclosure, as shown in FIG. 6, the display panel 100 including 2 control signal lines 50 is used as an example in FIG. 2, it should be understood that each row of pixel units 10 is electrically connected to a same scan line 20, as such, each row of pixel units 10 correspond to a same data write stage t, for ease of understanding and illustration, FIG. 6 shows that data write stages t corresponding to a first row of pixel units 10 to a fourth row of pixel units 10, respectively, may be labeled as t_1, t_2, t_3, and t_4, where each data write stage t includes a first stage t1 and a second stage t2, i.e., t_1 includes a first stage t1_1 and a second stage t2_1, t_2 includes a first stage t1_2 and a second stage t2_2, t_3 includes a first stage t1_3 and a second stage t2_3, t_4 includes a first stage t1_4 and a second stage t2_4, and so on. A m-th data write stage t_m corresponding to a m-th row of pixel units 10 includes a first stage t1 m and a second stage t2_m, where m=1, 2, 3, . . . .

Specifically, in a same data write stage t, in the first stage t1, during the enable duration of the j-th control signal Muxj, i.e., during a low level signal time duration of the j-th control signal Muxj, the j-th control signal Muxj controls the multiplexer 40 to gate a corresponding data line 30, so as to write a data signal into the data line 30 and charge the data line 30. In the second stage t2, a first scan enable voltage edge of the i-th scan signal Scani is located behind a first control enable voltage edge of the j-th control signal Muxj, that is, the falling edge at which the i-th scan signal Scani jumps from the high level signal to the low level signal is located behind the falling edge at which the j-th control signal Muxj jumps from the high level signal to the low level signal, the data signal on the data line 30 is written into the pixel unit 10 to cause the pixel unit 10 to perform the light-emitting display. It should be noted that, the first scan enable voltage edge of the i-th scan signal Scani may be located at any moment behind the first control enable voltage edge of the j-th control signal Muxj, which is not specifically limited in the embodiments of the present disclosure and may be set according to actual requirements, FIG. 6 is an exemplary illustration only, in other embodiments, the first scan enable voltage edge of the i-th scan signal Scani may also be located at the same moment as the second control enable voltage edge of the j-th control signal Muxj. In this manner, the data line 30 is charged before the pixel unit 10 is charged, whereby the normal display of the display panel is ensured.

Further, with continued reference to FIG. 6, the second scan enable voltage edge of the i-th scan signal Scani in a m-th data write stage t_m is located before a second control enable voltage edge of the n-th control signal Muxn in a (m+1)-th data write stage t_m+1, where |n−j|<h, 1≤n≤h, and m and n are positive integers.

For example, m=2, i=2, n=1, a rising edge at which the second scan signal Scan2 jumps from the low level signal to the high level signal in the second data write stage t_2 is located before the second control enable voltage edge of a rising edge at which the first control signal Mux1 jumps from the low level signal to the high level signal in the third data write stage t_3, as such, in a stage that the power signal PVDD fluctuates, the overlapping time of the fluctuation signal of the power signal PVDD and the enable duration of the i-th scan signal Scani in timing is reduced, whereby the influence on the data signal written into the pixel unit 10 is reduced, the normal light-emitting display of the pixel unit 10 is ensured, and thus the display effect of the display panel 100 is further improved.

It should be noted that enable durations of the scan signal Scan corresponding to all scan lines 20 in the display panel 100 may have the same width or may have different widths, which is not specifically limited in the embodiments of the present disclosure and may be set according to actual requirements. FIG. 6 is an exemplary illustration only, but is not limited thereto.

Furthermore, without special description, for ease of description of the scheme, the following embodiments are described by way of example with the enable signal corresponding to the enable duration of the i-th scan signal Scani being the low level signal, and the enable signal corresponding to the enable duration of the j-th control signal Muxj being the low level signal.

In summary, in the embodiments of the present disclosure, the display panel includes the multiple pixel units, the multiple scan lines, the multiple data lines, the multiplexer and the h control signal lines. The i-th scan line among the multiple scan lines is configured to transmit the i-th scan signal to the pixel units arranged in the row along the first direction, in the enable duration of the i-th scan signal, all transistors in a data write path of all pixel units electrically connected to the i-th scan signal may be controlled to be turned off by the i-th scan signal, so as to write a data signal into a transistor for driving a light-emitting element to emit light in the multiple pixel units. The first data lines among the multiple data lines are electrically connected to the pixel units of the odd-numbered rows in the column of pixel units among the multiple pixel units, the second data lines among the multiple data lines are electrically connected to the pixel units of the even-numbered rows in the column of pixel units among the multiple pixel units, so that the first data lines write data signals for the pixel units of the odd-numbered rows, and the second data lines write data signals for the pixel units of the even-numbered rows. Each of the multiple selector output terminals of the multiplexer is electrically connected to the respective one of the multiple data lines, and each of the h control signal lines is electrically connected to the respective one of the multiple selector control terminals, so that the j-th control signal line is configured to transmit the j-th control signal so as to gate the multiplexer to write the data signals into the data lines. As such, in a same data write stage of the display panel, during the first stage, the data signals are written into the multiple data lines at the enable duration of the j-th control signal so as to charge the data lines, during the second stage, the first scan enable voltage edge of the i-th scan signal is located behind the first control enable voltage edge of the j-th control signal, and the data signals on the multiple data lines are written into the multiple pixel units, so that the pixel units can perform the light-emitting display according to the written data signals; and the second scan enable voltage edge of the i-th scan signal in the m-th data write stage is located before the second control enable voltage edge of the n-th control signal in the (m+1)-th data write stage, where $|n-j|<h$, $1\leq n\leq h$, m and n are positive integers. Therefore, in the stage that the power signal PVDD fluctuates, an overlapping time of a fluctuation signal of the power signal PVDD and the enable duration of the i-th scan signal in timing is reduced, whereby the influence on the data signals written into the pixel units is reduced, the normal light-emitting display of the pixel units is ensured, the problem that the black line or the bright line appears at the junction of the black picture and the white picture of the display device is solved, and further the display effect of the display panel is improved.

Figure 7:
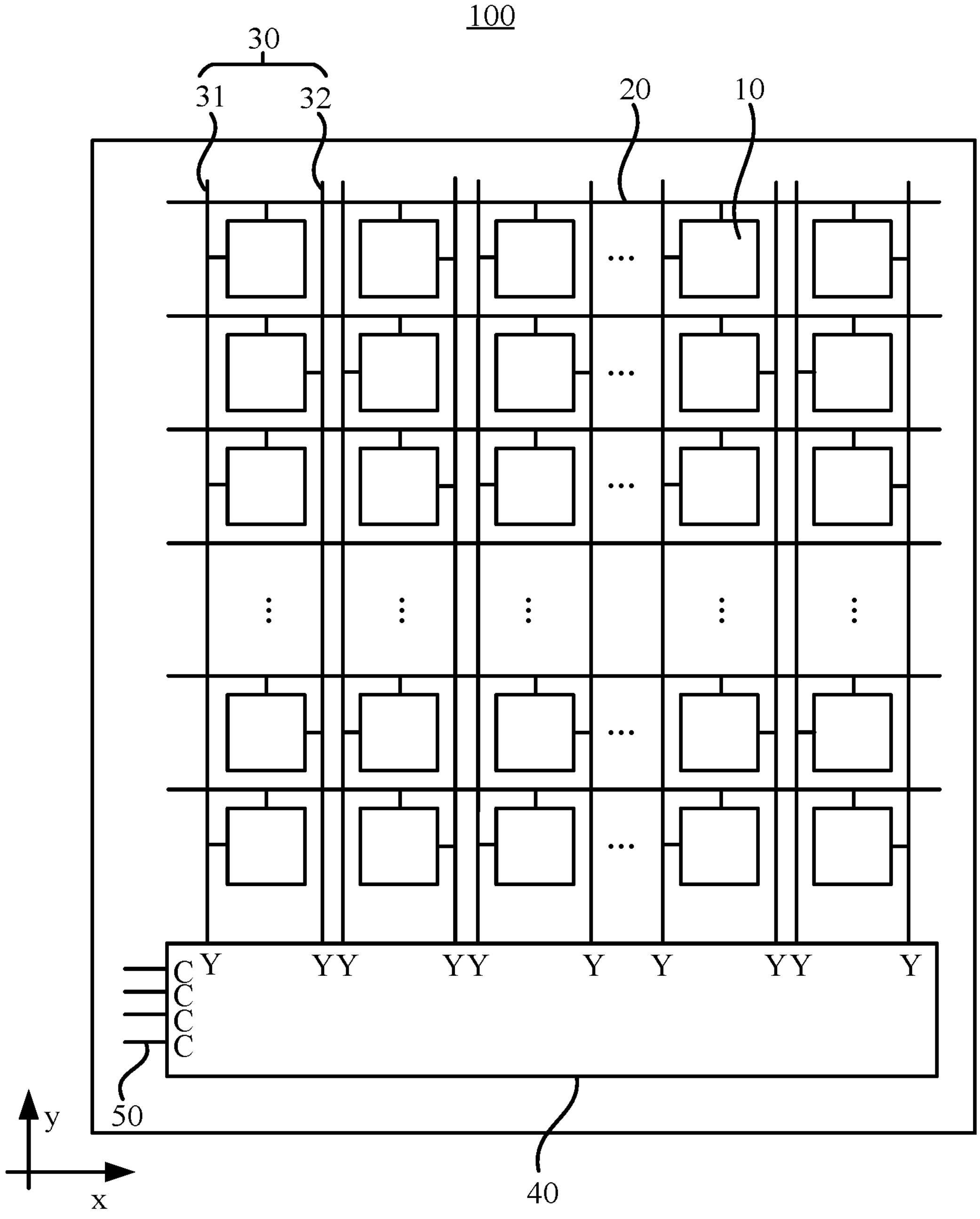
FIG. 7 is a schematic structural diagram of another display panel according to an embodiment of the present disclosure.
Figure 8:
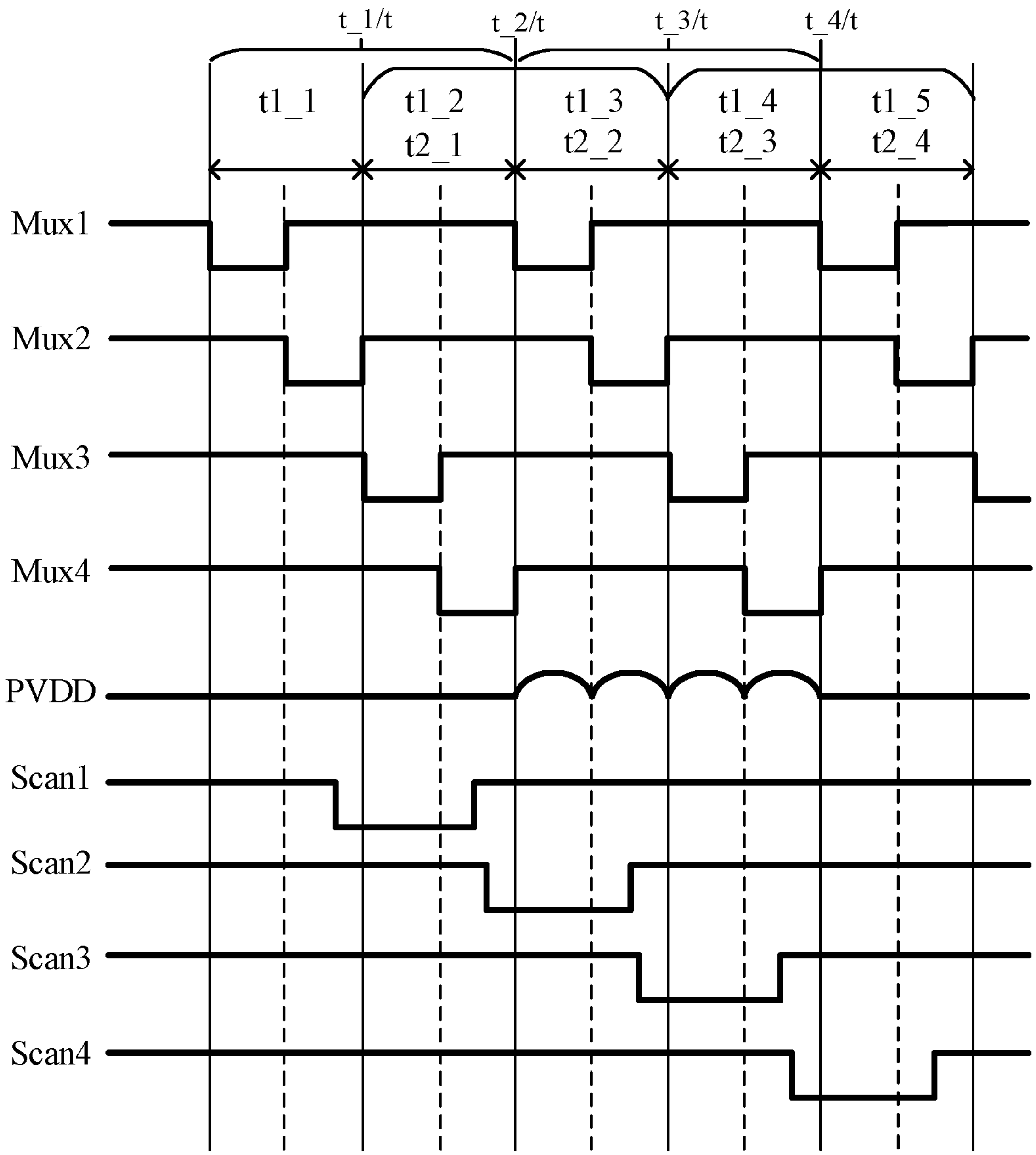
FIG. 8 is a drive timing diagram of another display panel according to an embodiment of the present disclosure.

In an embodiment, FIG. 7 is a schematic structural diagram of another display panel according to an embodiment of the present disclosure, FIG. 8 is a drive timing diagram of another display panel according to an embodiment of the present disclosure, as shown in FIG. 7 and FIG. 8, during the first stage t1, in which a data signal is also written into the data line 30 at an enable duration of the (j+1)-th control signal Mux (j+1), and during the second stage t2, the first scan enable voltage edge of the i-th scan signal Scani is located behind a first control enable voltage edge of the (j+1)-th control signal Mux (j+1).

Specifically, the display panel 100 includes four control signal lines 50, FIG. 7 shows that data signals may be written into the data lines 30 electrically connected to a same row of pixel units 10, and the data lines 30 may be charged within an enable duration of the first control signal Mux1 and an enable duration of the second control signal Mux2 of the first stage t1 or within an enable duration of the third control signal Mux3 and an enable duration of the fourth control signal Mux4 of the first stage t1. One control signal of the first control signal Mux' and the second control signal Mux2 may control the multiplexer 40 to gate so as to write a data signal into the first data line 31 of the data line 30, and the other control signal of the first control signal Mux' and the second control signal Mux2 may be used to control the multiplexer 40 to gate so as to write a data signal into the second data line 32 of the data line 30. Similarly, one control signal of the third control signal Mux3 and the fourth control signal Mux4 may be used to control the multiplexer 40 to gate so as to write a data signal into the first data line 31 of the data line 30, and the other control signal of the first control signal Mux1 and the second control signal Mux2 may be used to control the multiplexer 40 to gate so as to write a data signal into the second data line 32 of the data line 30.

In an embodiment, a same row of pixel units 10 being electrically connected to the second scan line is used as an example, during the first stage t1 (i.e., the first stage t1_2), at the enable duration of the third control signal Mux3 and at the enable duration of the fourth control signal Mux4, the multiplexer 40 may gate a respective data line 30 to write the data signal into the data line 30.

During the second stage t2, a falling edge at which the second scan signal Scan2 jumps from the high level signal to the low level signal is located behind a falling edge at which the fourth control signal Mux4 jumps from the high level signal to the low level signal, as such, after at least part of the data lines 30 are charged, a data signal on the data line 30 is written into the pixel unit 10, and the pixel unit 10 is charged, so as to ensure the normal display of the pixel unit 10 and improve the display effect of the display panel.

In an embodiment, with continued reference to FIG. 8, at an enable duration of the first control signal Mux1 and an enable duration of the second control signal Mux2 in the data write stage t of a (2k+1)-th row of pixel units 10, a data signal is written into the first data line 31, and k is a positive integer. At an enable duration of the third control signal Mux3 and an enable duration of the fourth control signal Mux4 in the data write stage t of a 2k-th row of pixel units 10, a data signal is written into the second data line 32. A second scan enable voltage edge of the (2k+1)-th scan signal Scan(2k+1) in the m-th data write stage t_m is located before a second control enable voltage edge of the fourth control signal in the (m+1)-th data write stage t_m+1.

Specifically, the first control signal Mux1 and the second control signal Mux2 control the multiplexer 40 to gate the first data lines 31, so as to write data signals into the first data lines 31, with reference to FIG. 2, the first data lines 31 are electrically connected to pixel units 10 of odd-numbered rows in a column of pixel units 10, so that the data signals are written into the first data lines 31 at the enable duration of the first control signal Mux1 and the enable duration of the second control signal Mux2 during the data write stage t of the pixel units 10 of the odd-numbered rows. The third control signal Mux3 and the fourth control signal Mux4 control the multiplexer 40 to gate the second data lines 32, so as to write data signals into the second data lines 32, the second data lines 32 are electrically connected to pixel units 10 of even-numbered rows in a column of pixel units 10, so that the data signals are written into the second data lines 32 at the enable duration of the third control signal Mux3 and the enable duration of the fourth control signal Mux4 during the data write stage t of the pixel units 10 of the odd-numbered rows.

With continued reference to FIG. 8, m=3, k=1, i.e., the third scan signal Scan3 in the third data write stage t_3 is used as an example, a rising edge at which the third scan signal Scan3 jumps from the low level signal to the high level signal is located before a rising edge at which the fourth control signal Mux4 jumps from the low level signal to the high level signal in the fourth data write stage t_4, as such, the overlapping time of the fluctuation signal of the power signal PVDD and the enable duration of the third scan signal Scan3 in timing is reduced, whereby the influence on the data signal written into the pixel unit 10 is reduced, the normal light-emitting display of the pixel unit 10 is ensured, and thus the display effect of the display panel 100 is further improved.

It should be noted that an enable duration of the scan signal Scan(2k) corresponding to the 2k-th row of pixel units 10 and an enable duration of the scan signal Scan(2k+1) corresponding to the (2k+1)-th row of pixel units 10 may have the same width or may have different widths, which is not specifically limited in the embodiments of the present disclosure and may be set according to actual requirements. FIG. 8 is an exemplary illustration only, and all scan signals in the following embodiments are illustrated by having the same width without special description.

Figure 9:
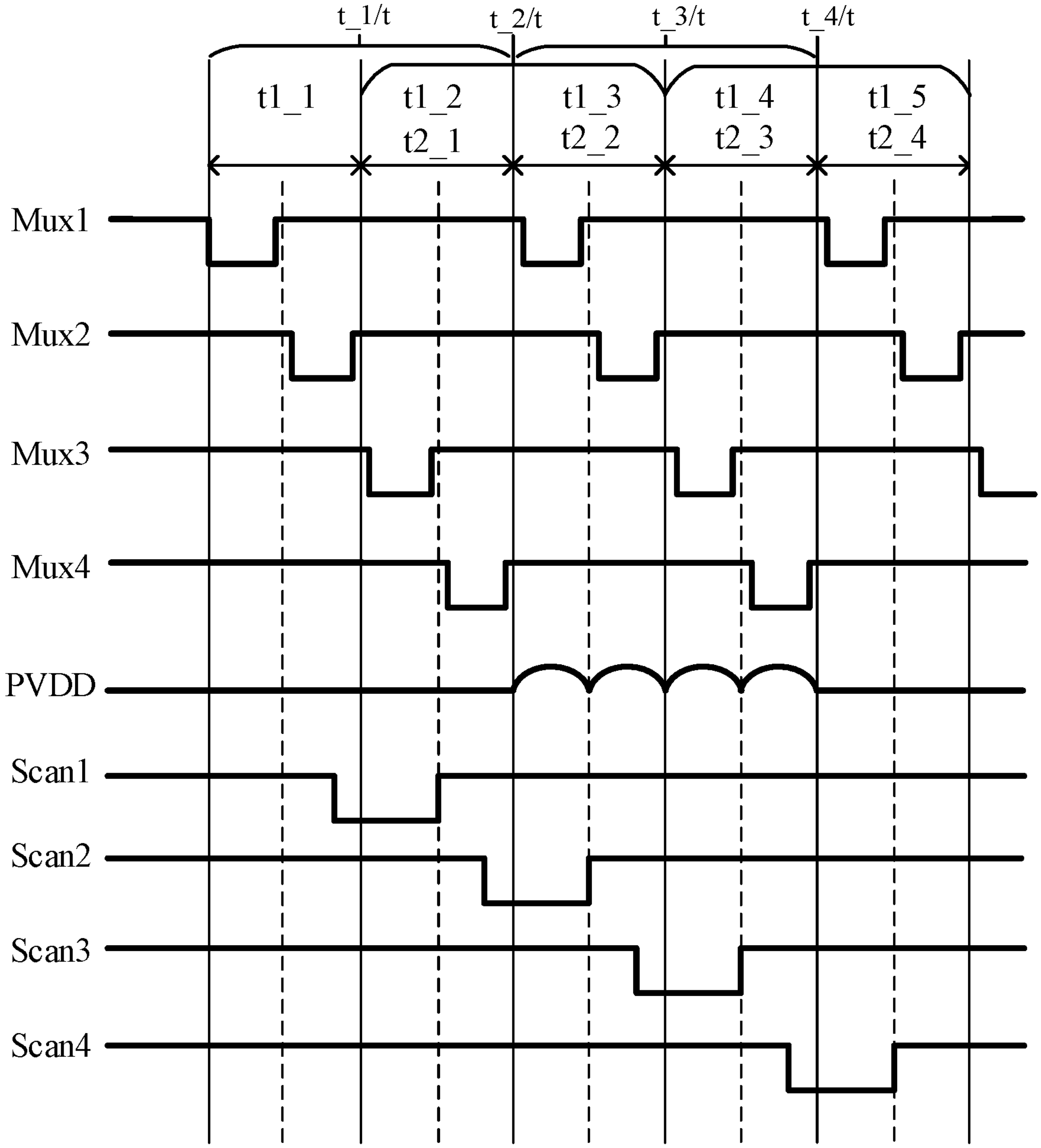
FIG. 9 is a drive timing diagram of yet another display panel according to an embodiment of the present disclosure.

In an embodiment, FIG. 9 is a drive timing diagram of yet another display panel according to an embodiment of the present disclosure, as shown in FIG. 9, a second scan enable voltage edge of the (2k+1)-th scan signal Scan(2k+1) in a m-th data write stage t_m is located before a first control enable voltage edge of the fourth control signal Mux4 in a (m+1)-th data write stage t_m+1.

In an embodiment, m=3 and k=1, i.e., the third scan signal Scan3 in the third data write stage t_3 is used as an example, a rising edge at which the third scan signal Scan3 jumps from the low level signal to the high level signal is located before a falling edge at which the fourth control signal Mux4 jumps from the high level signal to the low level signal in the fourth data write stage t_4. As such, the overlapping time of the fluctuation signal of the power signal PVDD and the enable duration of the third scan signal Scan3 in timing may be reduced, whereby the influence on the data signal written into the pixel unit 10 is reduced, the normal light-emitting display of the pixel unit 10 is ensured, and thus the display effect of the display panel 100 is improved.

Figure 10:
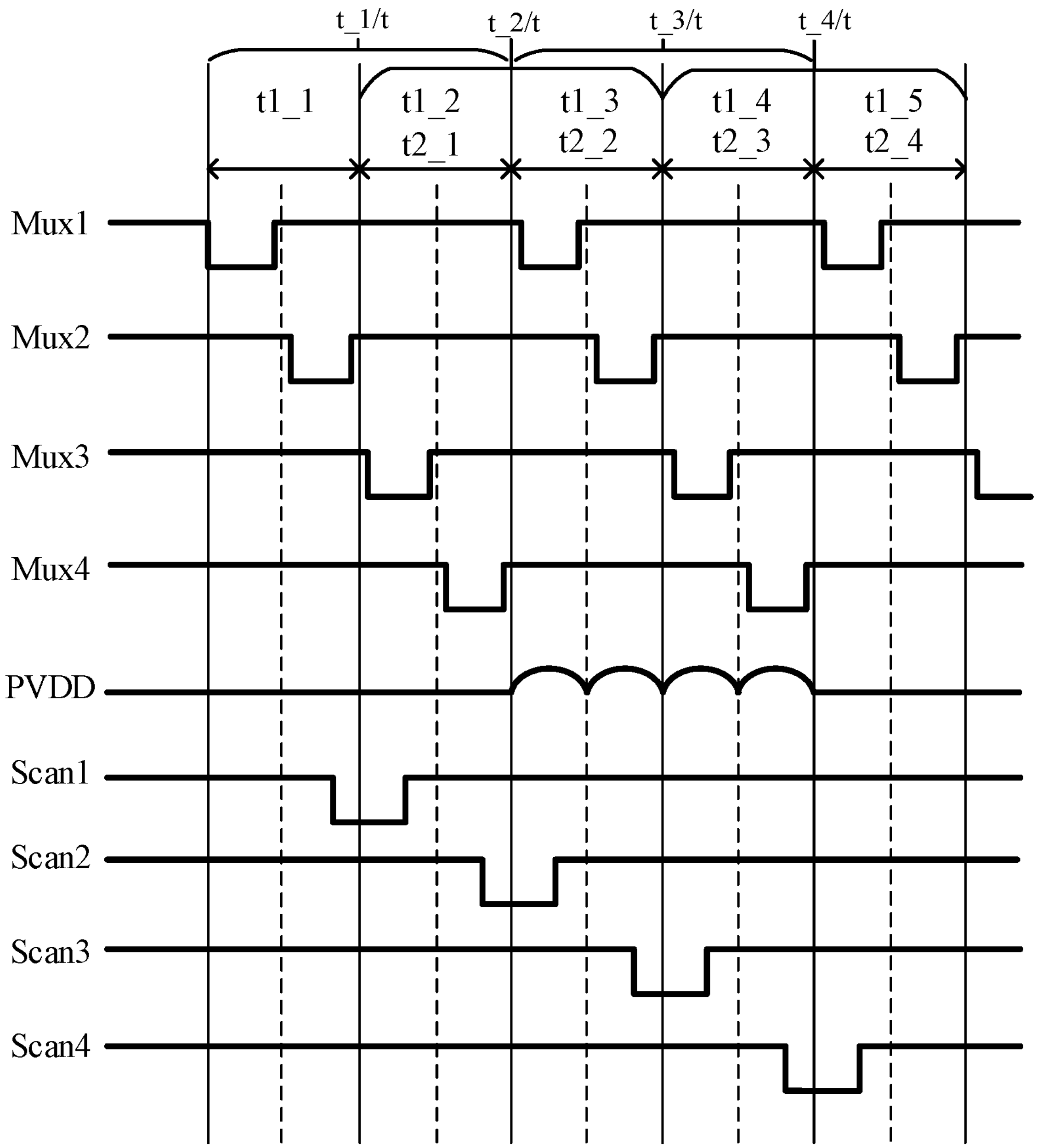
FIG. 10 is a drive timing diagram of yet another display panel according to an embodiment of the present disclosure.

In an embodiment, FIG. 10 is a drive timing diagram of yet another display panel according to an embodiment of the present disclosure, as shown in FIG. 10, a second scan enable voltage edge of the (2k+1)-th scan signal Scan(2k+1) in a m-th data write stage t_m is located before a second control enable voltage edge of the third control signal Mux3 in a (m+1)-th data write stage t_m+1.

In an embodiment, the third scan signal Scan3 in the third data write stage t_3 is used as an example, a rising edge at which the third scan signal Scan3 jumps from the low level signal to the high level signal is located before a rising edge at which the third control signal Mux3 jumps from the low level signal to the high level signal in the fourth data write stage t_4. As such, the overlapping time of the fluctuation signal of the power signal PVDD and the enable duration of the third scan signal Scan3 in timing may be reduced, whereby the influence on the data signal written into the pixel unit 10 is reduced, the normal light-emitting display of the pixel unit 10 is ensured, and thus the display effect of the display panel 100 is improved.

Figure 11:
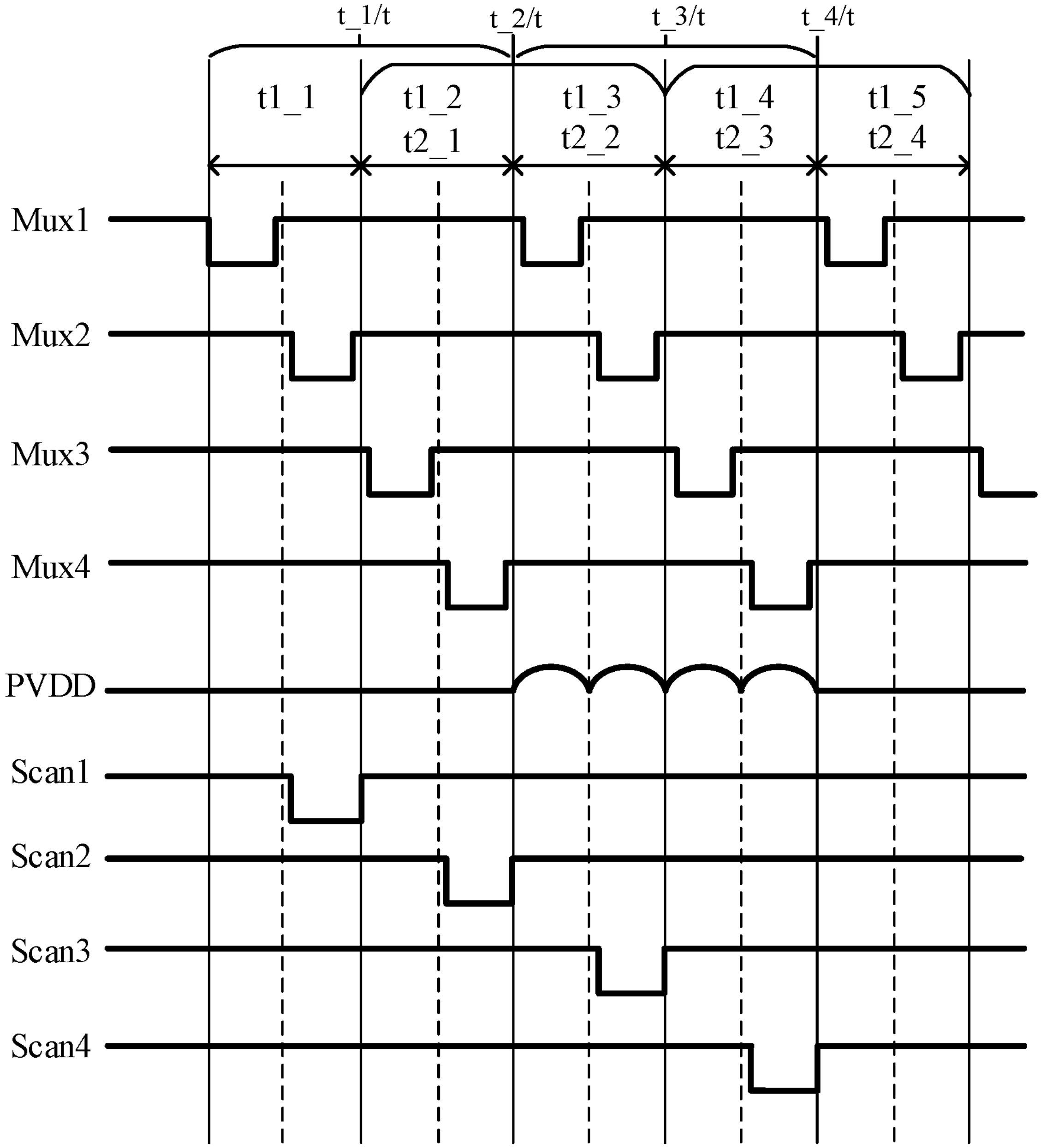
FIG. 11 is a drive timing diagram of yet another display panel according to an embodiment of the present disclosure.

In an embodiment, FIG. 11 is a drive timing diagram of yet another display panel according to an embodiment of the present disclosure, as shown in FIG. 11, a second scan enable voltage edge of the (2k+1)-th scan signal Scan(2k+1) in a m-th data write stage t_m is located before a first control enable voltage edge of the third control signal Mux3 in a (m+1)-th data write stage t_m+1.

In an embodiment, m=3 and k=1, i.e., the third scan signal Scan3 in the third data write stage t_3 is used as an example, a rising edge at which the third scan signal Scan3 jumps from the low level signal to the high level signal is located before a falling edge at which the third control signal Mux4 jumps from the high level signal to the low level signal in the fourth data write stage t_4. As such, the overlapping time of the fluctuation signal of the power signal PVDD and the enable duration of the third scan signal Scan3 in timing may be reduced, whereby the influence on the data signal written into the pixel unit 10 is reduced, the normal light-emitting display of the pixel unit 10 is ensured, and thus the display effect of the display panel 100 is improved.

Figure 12:
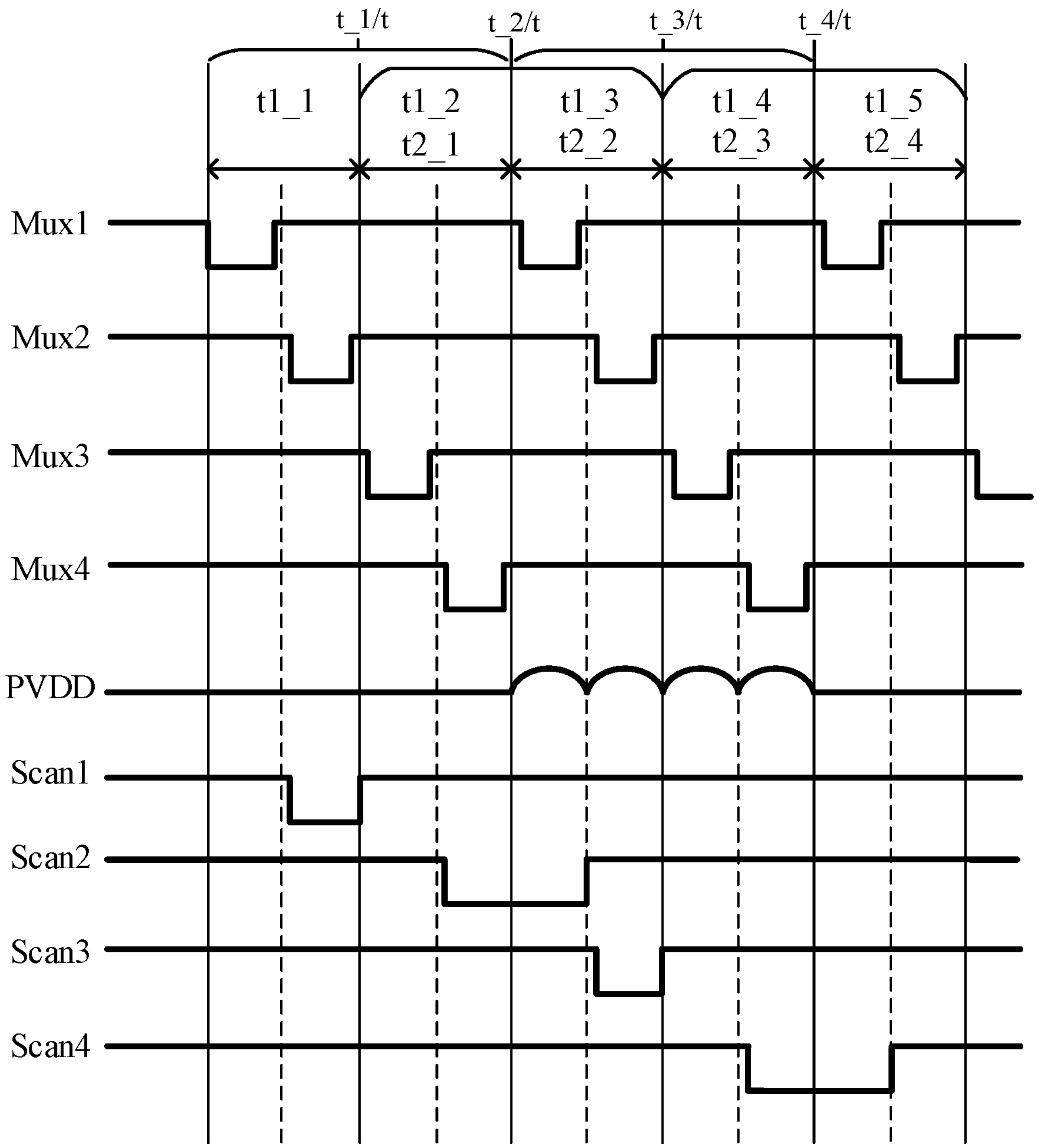
FIG. 12 is a drive timing diagram of yet another display panel according to an embodiment of the present disclosure.

In an embodiment, FIG. 12 is a drive timing diagram of yet another display panel according to an embodiment of the present disclosure, as shown in FIG. 12, a second scan enable voltage edge of the 2k-th scan signal Scan(2k) in a m-th data write stage t_m is located before a first control enable voltage edge of the second control signal Mux2 in a (m+1)-th data write stage t_m+1.

In an embodiment, m=2 and k=1, i.e., the second scan signal Scan2 in the second data write stage t_2 is used as an example, a rising edge at which the second scan signal Scan2 jumps from the low level signal to the high level signal is located before a falling edge at which the second control signal Mux2 jumps from the high level signal to the low level signal in the third data write stage t_3. As such, the overlapping time of the fluctuation signal of the power signal PVDD and the enable duration of the second scan signal Scan2 in timing may be reduced, whereby the influence on the data signal written into the pixel unit 10 is reduced, the normal light-emitting display of the pixel unit 10 is ensured, and thus the display effect of the display panel 100 is improved.

It should be noted that, in this embodiment, an enable duration of the 2k-th scan signal Scan(2k) and an enable duration of the (2k+1)-th scan signal Scan(2k+1) may have the same width or may have different widths, which is not specifically limited in the embodiments of the present disclosure and may be set according to actual requirements. FIG. 12 is an exemplary illustration only, but is not limited thereto.

Figure 13:
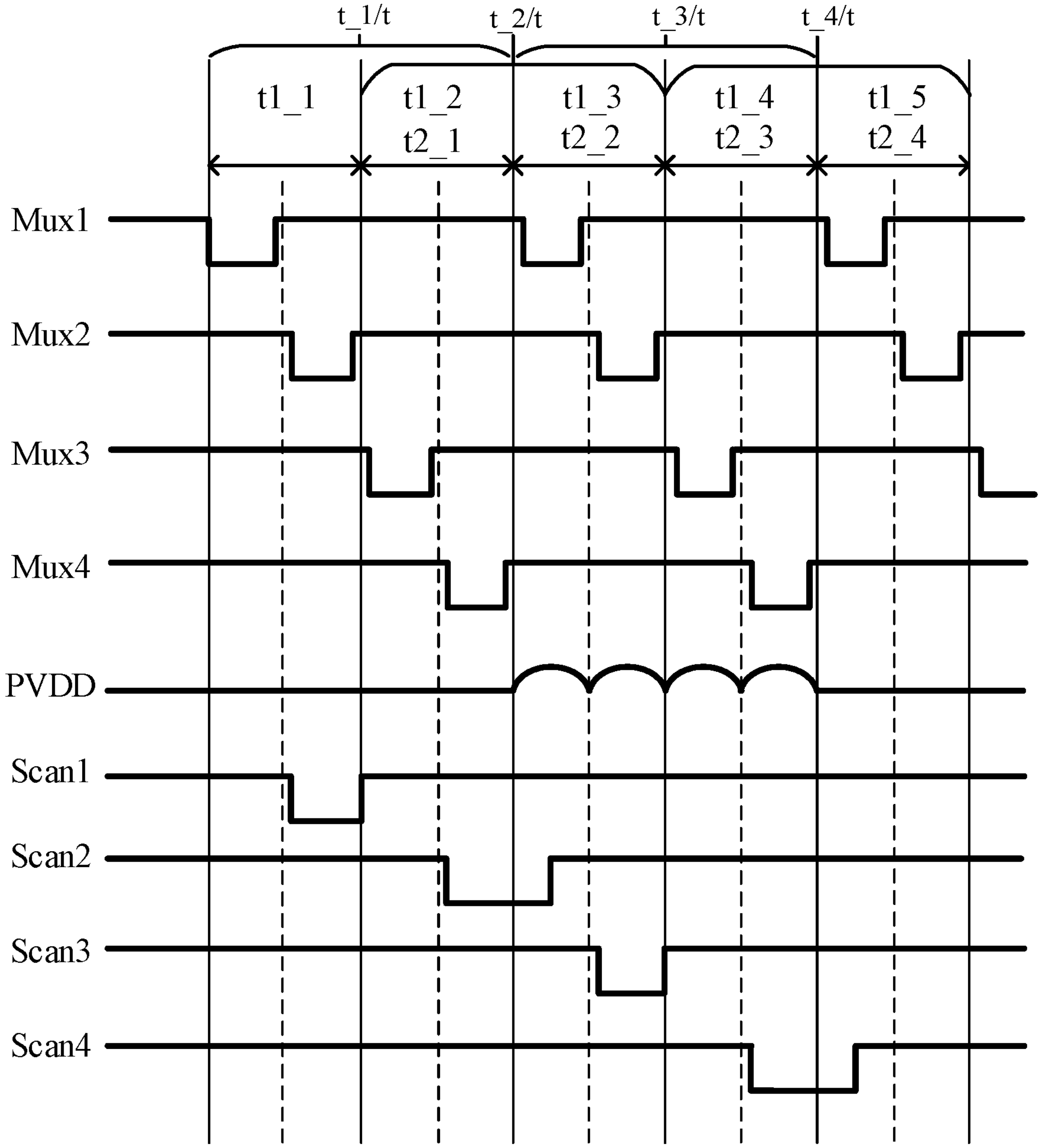
FIG. 13 is a drive timing diagram of yet another display panel according to an embodiment of the present disclosure.

In an embodiment, FIG. 13 is a drive timing diagram of yet another display panel according to an embodiment of the present disclosure, as shown in FIG. 13, a second scan enable voltage edge of the 2k-th scan signal Scan(2k) in a m-th data write stage t_m is located before a second control enable voltage edge of the first control signal Mux1 in a (m+1)-th data write stage t_m+1.

In an embodiment, m=2 and k=1, i.e., the second scan signal Scan2 in the second data write stage t_2 is used as an example, a rising edge at which the second scan signal Scan2 jumps from the low level signal to the high level signal is located before a rising edge at which the first control signal Mux1 jumps from the low level signal to the high level signal in the third data write stage t_3. As such, the overlapping time of the fluctuation signal of the power signal PVDD and the enable duration of the second scan signal Scan2 in timing may be reduced, whereby the influence on the data signal written into the pixel unit 10 is reduced, the normal light-emitting display of the pixel unit 10 is ensured, and thus the display effect of the display panel 100 is improved.

Figure 14:
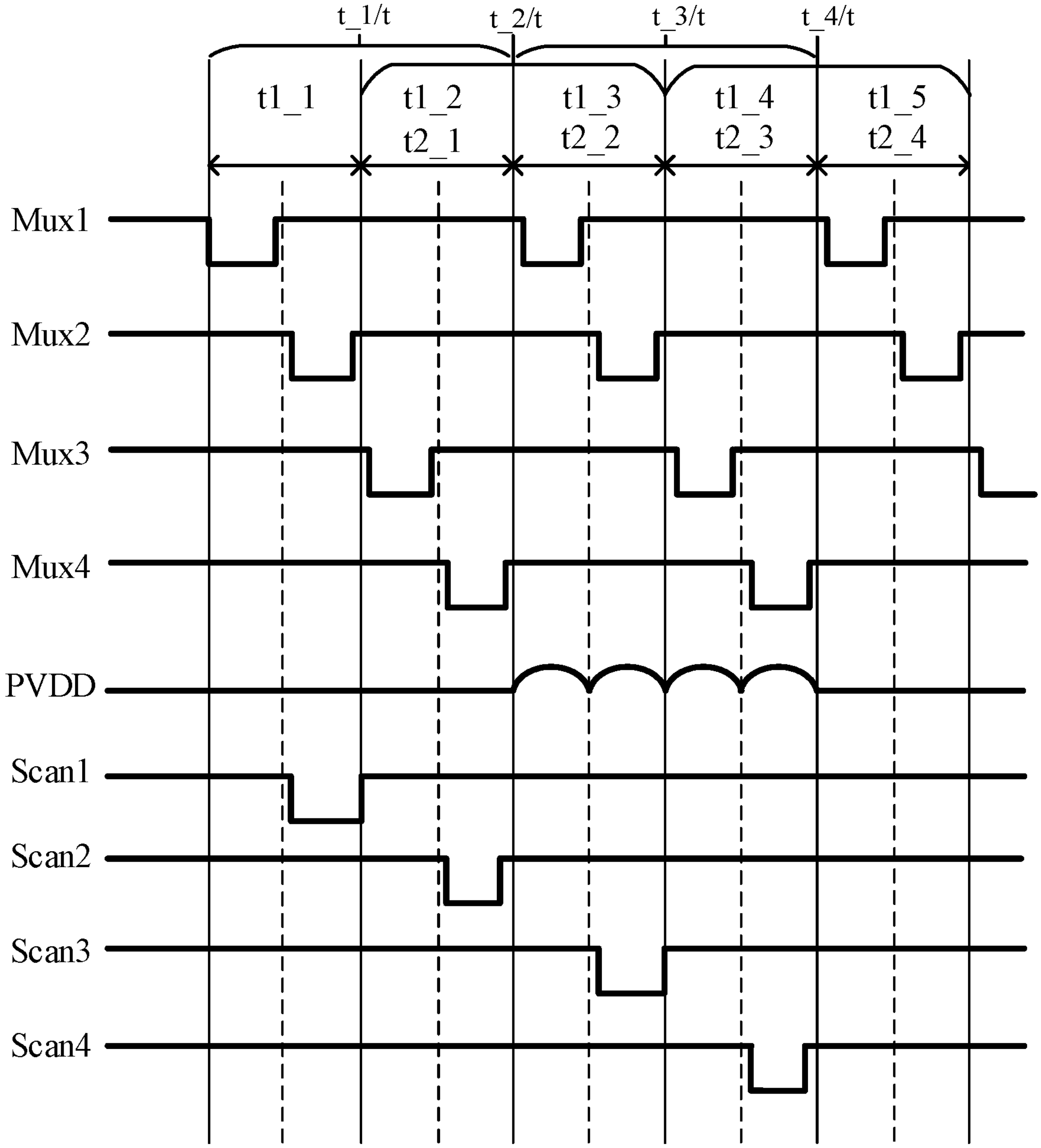
FIG. 14 is a drive timing diagram of yet another display panel according to an embodiment of the present disclosure.

In an embodiment, FIG. 14 is a drive timing diagram of yet another display panel according to an embodiment of the present disclosure, as shown in FIG. 14, a second scan enable voltage edge of the 2k-th scan signal Scan(2k) in a m-th data write stage t_m is located before a first control enable voltage edge of the first control signal Mux1 in a (m+1)-th data write stage t_m+1.

In an embodiment, m=2 and k=1, i.e., the second scan signal Scan2 in the second data write stage t_2 is used as an example, a rising edge at which the second scan signal Scan2 jumps from the low level signal to the high level signal is located before a falling edge at which the first control signal Mux1 jumps from the high level signal to the low level signal in the third data write stage t_3. As such, the fluctuation signal of the power signal PVDD and the enable duration of the second scan signal Scan2 do not overlap in timing, whereby the influence of the fluctuating signal of the power signal PVDD on the data signal written into the pixel unit 10 is avoided, the normal light-emitting display of the pixel unit 10 is ensured, and thus the display effect of the display panel 100 is improved.

In an embodiment, with continued reference to FIGS. 8 to 14, a second scan enable voltage edge of the (2k−1)-th scan signal Scan(2k−1) in a m-th data write stage t_m is located before a first control enable voltage edge of the first control signal Mux1 in a (m+2)-th data write stage t_m+2.

Specifically, in the m-th data write stage t_m, an enable signal of the (2k−1)-th scan signal Scan(2k−1) transmitted by the (2k−1)-th scan line may control transistors corresponding to a (2k−1)-th row of pixel units 10 to be turned off, to write data signals to the (2k−1)-th row of pixel units 10. At the enable duration of the first control signal Mux1 and the enable duration of the second control signal Mux2 in the (m+2)-th data write stage t_m+2, a data signal is written into the first data line 31, the first data line 31 is charged, that is, the first data line 31 electrically connected to the (2k+1)-th row of pixel units 10 is charged. As such, a second scan enable voltage edge of the (2k−1)-th scan signal Scan(2k−1) in the m-th data write stage t_m is set to be located before a first control enable voltage edge of the first control signal Mux' in a (m+2)-th data write stage t_m+2, so that in the second direction y along the display panel 100, the multiple scan lines 20 electrically connected to the pixel units 10 of the odd-numbered rows are scanned row-by-row, and charging of the data lines 30 electrically connected to pixel units 10 of a next odd-numbered row is started after charging of pixel units 10 of a previous odd-numbered row is completed, and thus the row-by-row light-emitting display of the pixel units 10 of the odd-numbered rows in the display panel 100 is achieved.

In an embodiment, m=1, k=1, i.e., the first scan signal Scant in the first data write stage t_1 is used as an example, a rising edge at which the first scan signal Scant jumps from the low level signal to the high level signal is located before a falling edge at which the first control signal Mux1 jumps from the high level signal to the low level signal in the third data write stage t_3.

In an embodiment, the first scan enable voltage edge of the (2k+2)-th scan signal Scan(2k+2) in the m-th data write stage t_m is located behind the second control enable voltage edge of the fourth control signal Mux4 in the m-th data write stage t_m.

Specifically, at an enable duration of the fourth control signal Mux4 of the m-th data write stage t_m, a data signal is written into the second data line 32, that is, the second data line 32 electrically connected to the 2k-th row of pixel units 10 is charged. An enable signal of the (2k+2)-th scan signal Scan(2k+2) transmitted by the (2k+2)-th scan line in the m data write stages t_m may control transistors corresponding to a (2k+2)-th row of pixel units 10 to be turned off, so as to write a data signal into the (2k+2)-th row of pixel units 10. As such, a first scan enable voltage edge of the (2k+2)-th scan signal Scan(2k+2) in the m-th data write stage t_m is set to be located after a second control enable voltage edge of the fourth control signal Mux4 in a m-th data write stage t_m, the overlapping time of the fluctuation signal of the power signal PVDD and the enable duration of the (2k+2)-th scan signal Scan(2k+2) in timing may be reduced, whereby the influence on the data signal written into the pixel unit 10 is reduced, the normal light-emitting display of the pixel unit 10 is ensured, and thus the display effect of the display panel 100 is improved.

In other embodiments, with reference to FIG. 6, a data signal is written into the first data line 31 at the enable duration of the first control signal Mux1 of the data write stage t of the (2k+1)-th row of pixel units 10, and k is a positive integer. A data signal is written into the second data line 32 at the enable duration of the second control signal Mux2 of the data write stage t of the 2k-th row of pixel units 10. A second scan enable voltage edge of the (2k+1)-th scan signal Scan(2k+1) in the m-th data write stage t_m is located before a second control enable voltage edge of the second control signal Mux2 in the (m+1)-th data write stage t_m+1.

Referring to FIG. 2, 1 control signal line 50 is included in the display panel 100, data signals may be written into the first data lines 31 electrically connected to the pixel units 10 of the odd-numbered rows within the enable duration of the first control signal Mux1 of the data write stage t, and data signals may be written into the second data lines 32 electrically connected to the pixel units 10 of the even-numbered rows within the enable duration of the second control signal Mux2 of the data write stage t.

In an embodiment, m=3 and k=1, i.e., the third scan signal Scan3 in the third data write stage t_3 is used as an example, a rising edge at which the third scan signal Scan3 jumps from the low level to the high level is located before a rising edge at which the second control signal Mux2 jumps from the low level to the high level in the fourth data write stage t_4. As such, the overlapping time of the fluctuation signal of the power signal PVDD and the enable duration of the third scan signal Scan3 in timing may be reduced, whereby the influence on the data signal written into the pixel unit 10 is reduced, the normal light-emitting display of the pixel unit 10 is ensured, and thus the display effect of the display panel 100 is improved.

Figure 15:
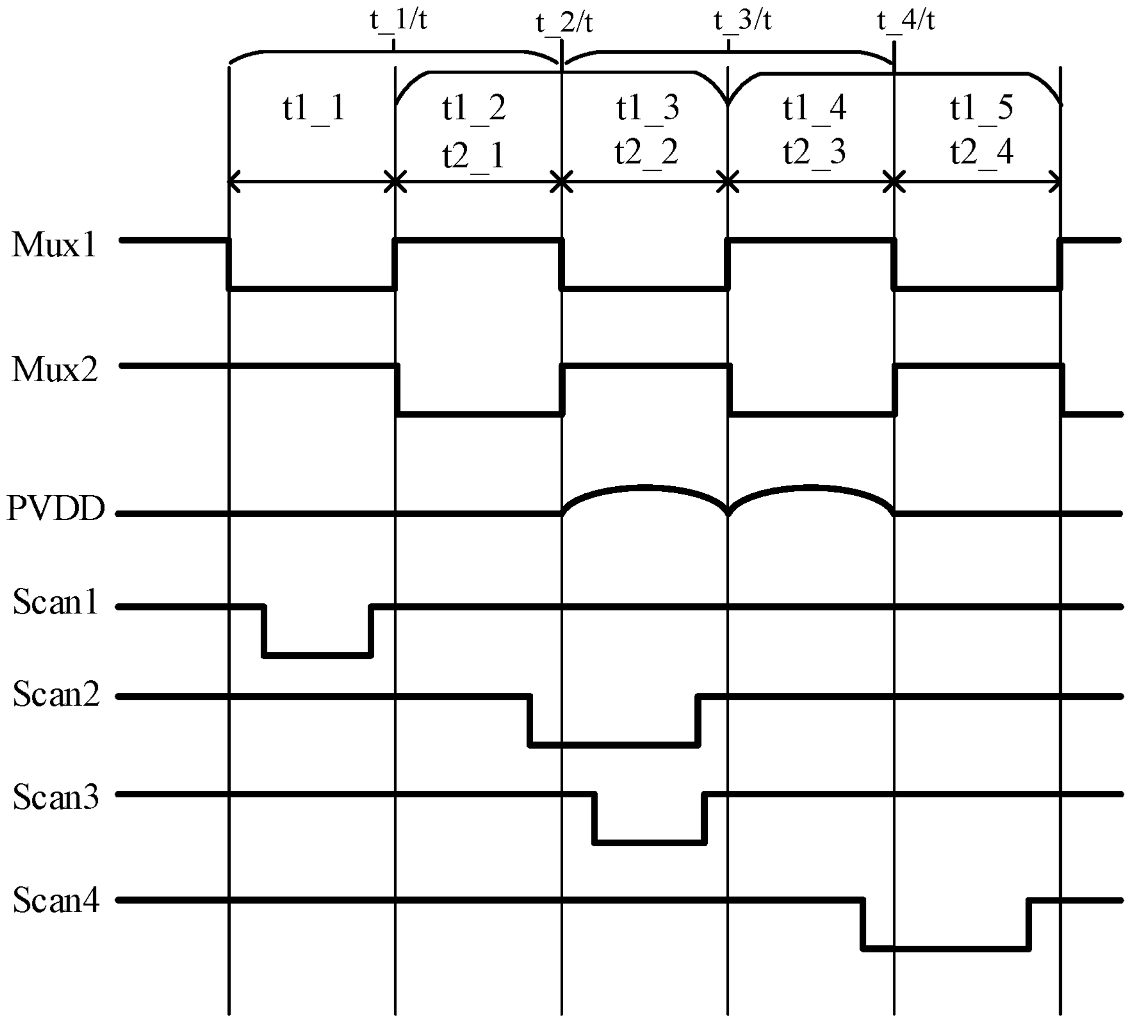
FIG. 15 is a drive timing diagram of yet another display panel according to an embodiment of the present disclosure.

In an embodiment, FIG. 15 is a drive timing diagram of yet another display panel according to an embodiment of the present disclosure, as shown in FIG. 15, a second scan enable voltage edge of the (2k+1)-th scan signal Scan(2k+1) in the m-th data write stage t_m is located before a first control enable voltage edge of the second control signal Mux2 in the (m+1)-th data write stage t_m+1.

In an embodiment, m=3 and k=1, i.e., the third scan signal Scan3 in the third data write stage t_3 is used as an example, a rising edge at which the third scan signal Scan3 jumps from the low level to the high level is located before a falling edge at which the second control signal Mux2 jumps from the high level to the low level in the fourth data write stage t_4. As such, the overlapping time of the fluctuation signal of the power signal PVDD and the enable duration of the third scan signal Scan3 in timing may be reduced, whereby the influence on the data signal written into the pixel unit 10 is reduced, the normal light-emitting display of the pixel unit 10 is ensured, and thus the display effect of the display panel 100 is improved.

It should be noted that, in this embodiment, an enable duration of the (2k+1)-th scan signal Scan(2k+1) and an enable duration of the 2k-th scan signal Scan(2k) may have the same width or may have different widths, which is not specifically limited in the embodiments of the present disclosure and may be set according to actual requirements. FIG. 15 is an exemplary illustration only, but is not limited thereto.

Figure 16:
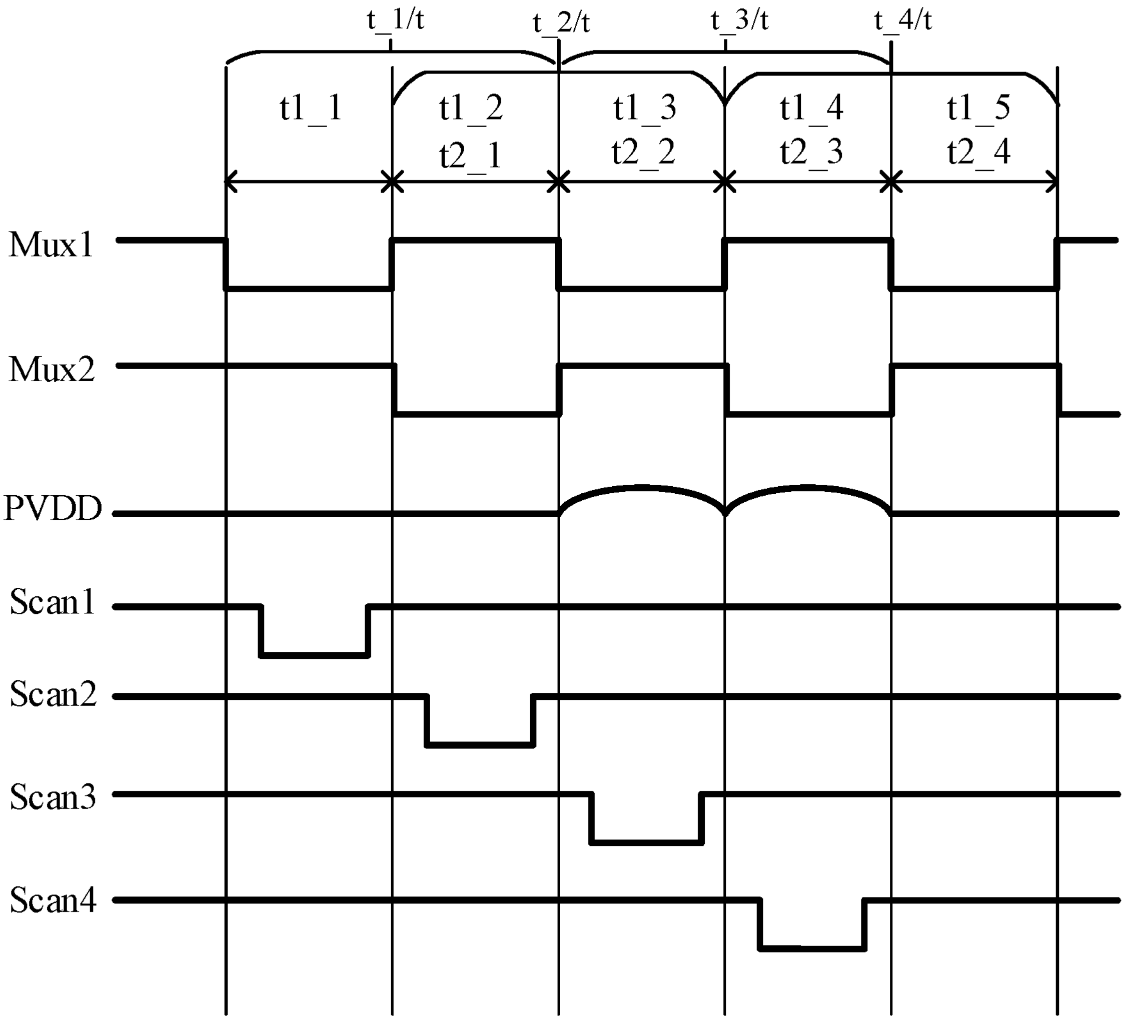
FIG. 16 is a drive timing diagram of yet another display panel according to an embodiment of the present disclosure.

In an embodiment, FIG. 16 is a drive timing diagram of yet another display panel according to an embodiment of the present disclosure, as shown in FIG. 16, a second scan enable voltage edge of the 2k-th scan signal in a m-th data write stage t_m is located before a first control enable voltage edge of the first control signal Mux1 in a (m+1)-th data write stage t_m+1.

In an embodiment, m=2 and k=1, i.e., the second scan signal Scan2 in the second data write stage t_2 is used as an example, a rising edge at which the second scan signal Scan2 jumps from the low level signal to the high level signal is located before a falling edge at which the first control signal Mux1 jumps from the high level signal to the low level signal in the third data write stage t_3. As such, the fluctuation signal of the power signal PVDD and the enable duration of the second scan signal Scan2 do not overlap in timing, whereby the influence of the fluctuating signal of the power signal PVDD on the data signal written into the pixel unit 10 is avoided, the normal light-emitting display of the pixel unit 10 is ensured, and thus the display effect of the display panel 100 is improved.

On the basis of any one of the above embodiments, all scan signals have enable durations with a same width. As such, time lengths during which corresponding transistors in all pixel units 10 in the display panel 100 are turned off are the same, that is, time lengths during which data signals are written into the pixel units 10 are the same, whereby the same display effect of the pixel units 10 can be ensured, and thus the display quality of the display panel 100 may be improved.

Figure 17:
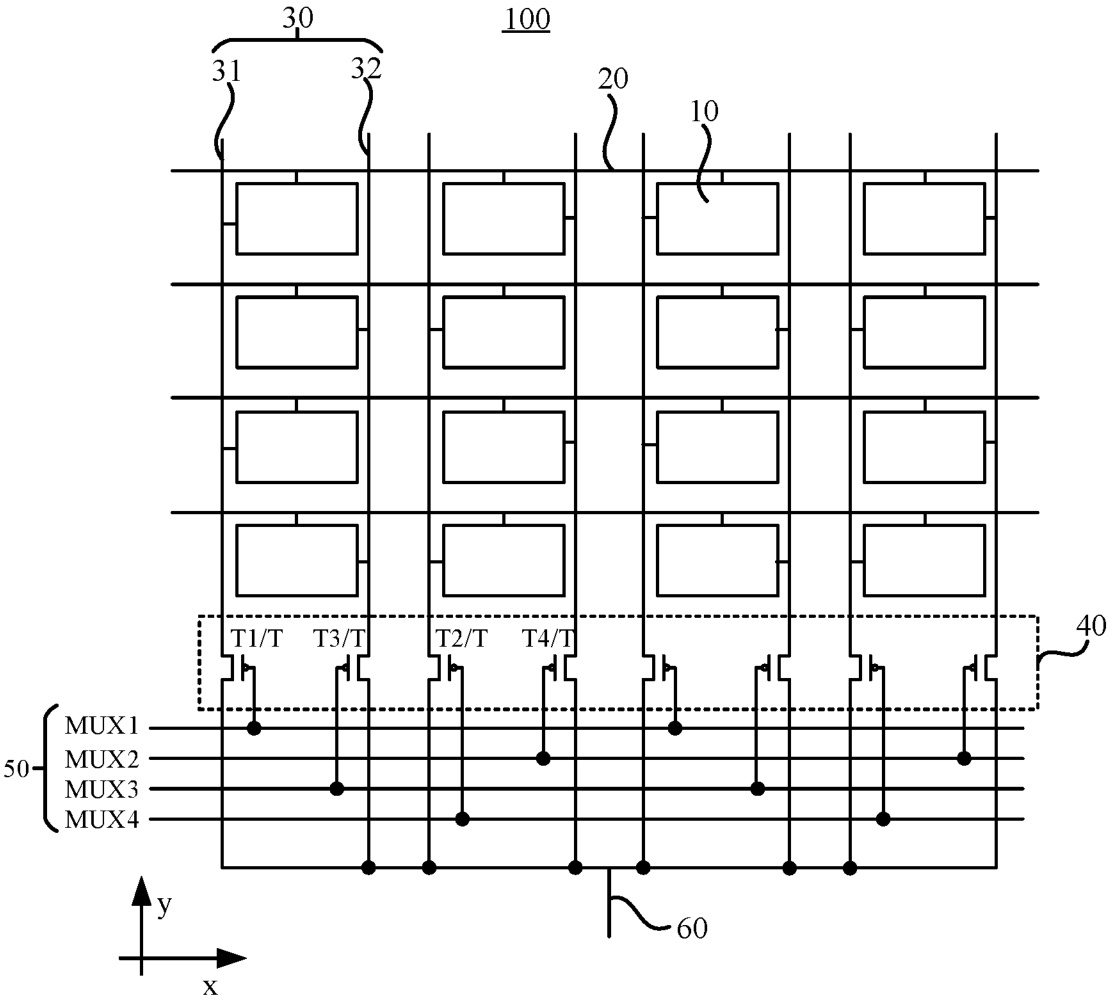
FIG. 17 is a schematic diagram showing a partial structure of a display panel according to an embodiment of the present disclosure.

In an embodiment, FIG. 17 is a schematic diagram showing a partial structure of a display panel according to an embodiment of the present disclosure, as shown in FIG. 17, the display panel 100 further includes a source signal line 60, and the multiplexer 40 includes h switch transistors T, first poles of the h switch transistors T are each connected to a same source signal line 60, second poles of the switch transistors T are connected to one first data line 31 or one second data line 32, and gates of the h switch transistors T are electrically connected to the h control signal lines 50 in one-to-one correspondence.

Where h may be any value, which is not specifically limited in the embodiments of the present disclosure. FIG. 17 shows that the display panel 100 includes 4 control signal lines 50 and h switch transistors T, the 4 control signal lines 50 are a first control signal line MUX1, a second control signal line MUX2, a third control signal line MUX3, and a fourth control signal line MUX4, respectively, where the h switch transistors T at least include a first switch transistor T1, a second switch transistor T2, a third switch transistor T3, and a fourth switch transistor T4.

Specifically, the switch transistor T may be an N-channel transistor or a P-channel transistor, which is not specifically limited in the embodiments of the present disclosure and may be set according to actual requirements. FIG. 17 schematically shows the schematic structural diagram of the switch transistor T being the P-channel transistor, as such, the switch transistor T electrically connected to the control signal line 50 may be controlled to be turned on when the control signal Mux transmitted by the control signal line 50 is a low level signal, and the switch transistor T electrically connected to the control signal line 50 may be controlled to be turned off when the control signal Mux transmitted by the control signal line 50 is a high level signal.

In an embodiment, with continued reference to FIG. 17, the h switch transistors T include a first switch transistor T1, a second switch transistor T2, a third switch transistor T3, and a fourth switch transistor T4; a second pole of the first switch transistor T1 and a second pole of the second switch transistor T2 are respectively connected to a respective one of two first data lines 31, and a second pole of the third switch transistor T3 and a second pole of the fourth switch transistor T4 are respectively connected to a respective one of two second data lines 32.

Specifically, the first control signal line MUX1 is electrically connected to a gate of the first switch transistor T1, the second control signal line MUX2 is electrically connected to a gate of the fourth switch transistor T4, a third control signal line MUX3 is electrically connected to a gate of the third switch transistor T3, a fourth control signal line MUX4 is electrically connected to a gate of the second switch transistor T2, as such, the first switch transistor T1 and the fourth switch transistor T4 may be controlled to be turned on at an enable duration of the first control signal Mux1 transmitted by the first control signal line MUX1 and an enable duration of the second control signal Mux2 transmitted by the second control signal line MUX2, so as to cause a data signal provided by the source signal line 60 to be written onto the first data line 31 and the second data line 32. Similarly, the second switch transistor T2 and the third switch transistor T3 can be controlled to be turned on at an enable duration of the third control signal Mux3 transmitted by the third control signal line MUX3 and an enable duration of the fourth control signal Mux4 transmitted by the fourth control signal line MUX4, so as to cause the data signal provided by the source signal line 60 to be written onto the first data line 31 and the second data line 32.

In an embodiment, the multiple data lines 30 are arranged in the first direction x, and two first data lines 31 or two second data lines 32 are located between two adjacent columns of pixel units 10 in the first direction x.

Specifically, with continued reference to FIG. 2, FIG. 7, or FIG. 17, two first data lines 31 and two second data lines 32 are located between two adjacent columns of pixel units 10 in the first direction x, that is, the first data line 31 and the second data line 32 electrically connected to a same column of pixel units 10 are located on two sides of the column of pixel units 10, respectively, and the first data line 31 or the second data line 32 electrically connected to each column of pixel units 10 are located on a same side of the pixel units 10.

Figure 18:
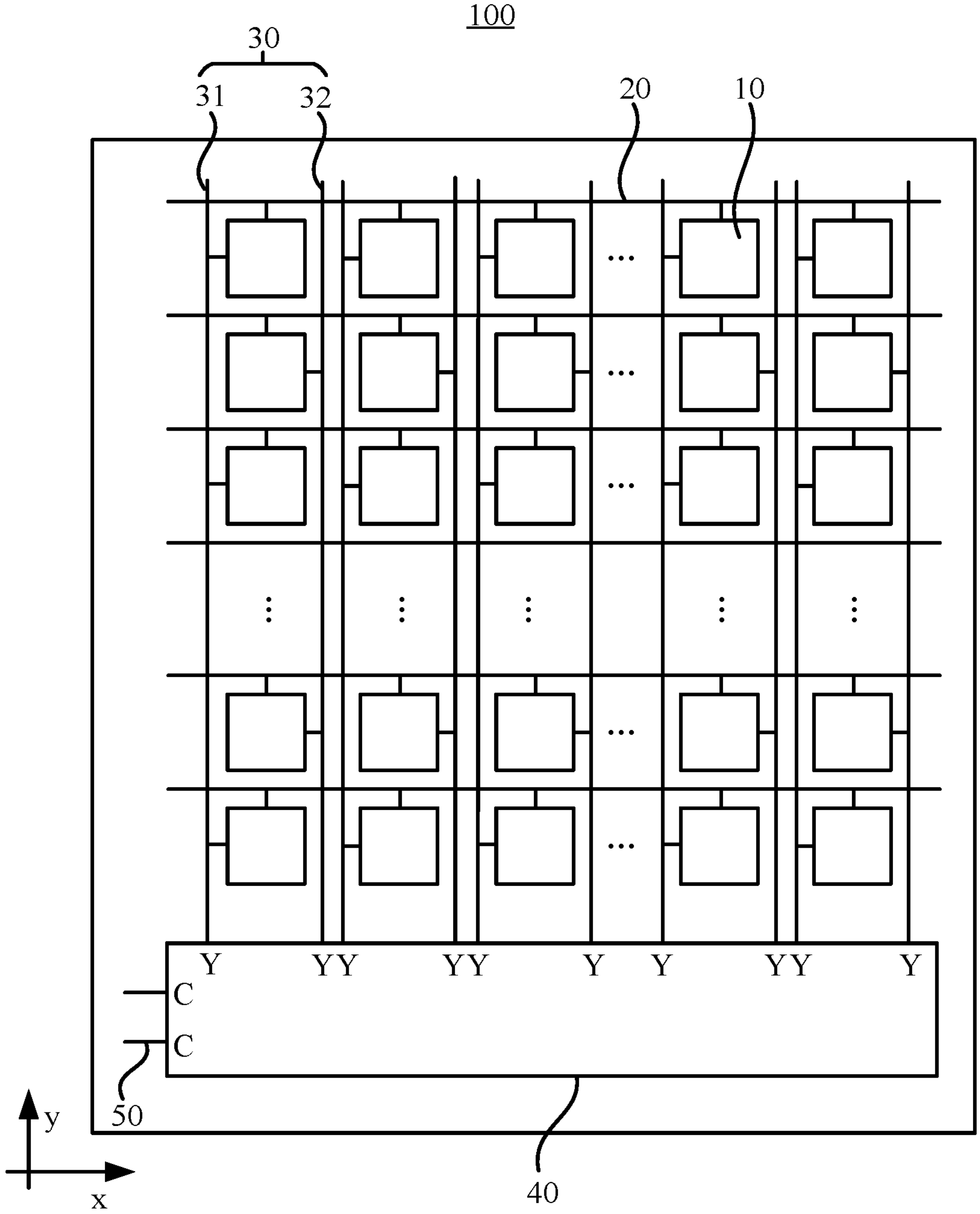
FIG. 18 is a schematic structural diagram of yet another display panel according to an embodiment of the present disclosure.

In another embodiment, FIG. 18 is a schematic structural diagram of yet another display panel according to an embodiment of the present disclosure, as shown in FIG. 18, the multiple data lines 30 are arranged in the first direction x, one first data line 31 and one second data line 32 are located between two adjacent columns of pixel units 10 in the first direction x. FIG. 18 is an exemplary illustration only, but is not limited thereto.

Figure 19:
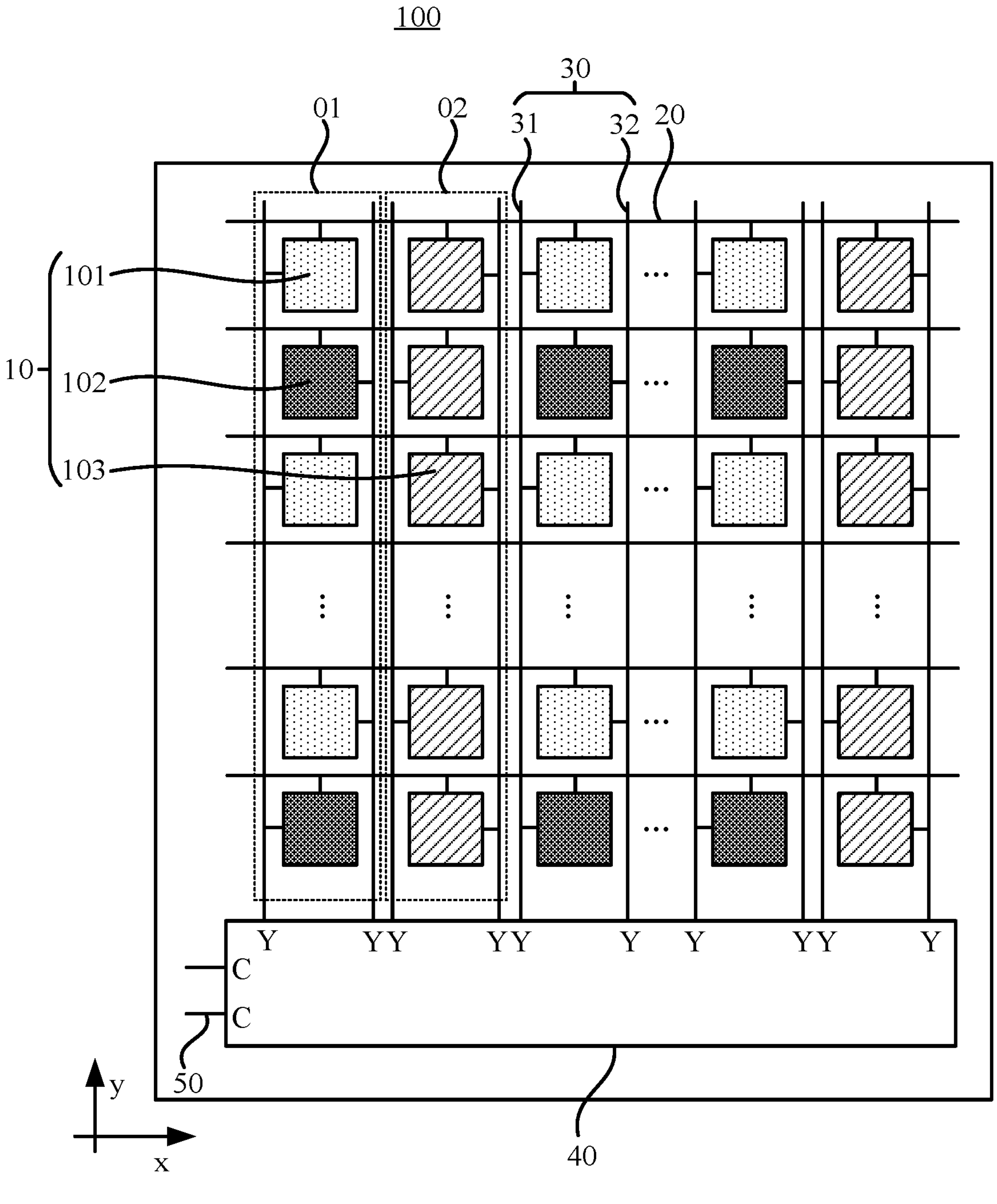
FIG. 19 is a schematic structural diagram of yet another display panel according to an embodiment of the present disclosure.

In an embodiment, FIG. 19 is a schematic structural diagram of yet another display panel according to an embodiment of the present disclosure, as shown in FIG. 19, the multiple pixel units 10 are arranged in an array along the first direction x and the second direction y and include first pixel columns 01 and second pixel columns 02, in the first direction x, one second pixel column 02 is located between two first pixel columns 01, and one first pixel column 01 is located between two second pixel columns 02. The first pixel columns 01 include a first pixel unit 101 and a second pixel unit 102 disposed at one-to-one interval in the second direction y, and the second pixel columns 02 include third pixel units 103 arranged in the second direction y, and two pixel units of the first pixel unit 101, the second pixel unit 102, and the third pixel unit 103 have different emitted colors.

Emitted colors of the first pixel unit 101, the second pixel unit 102, and the third pixel unit 103 include, but are not limited to, red, green, blue, yellow, white, cyan, magenta, and the like, which is not specifically limited in the embodiments of the present disclosure. For example, the emitted color of the first pixel 101 is red, the emitted color of the second pixel 102 is blue, and the emitted color of the third pixel 103 is green.

Figure 20:
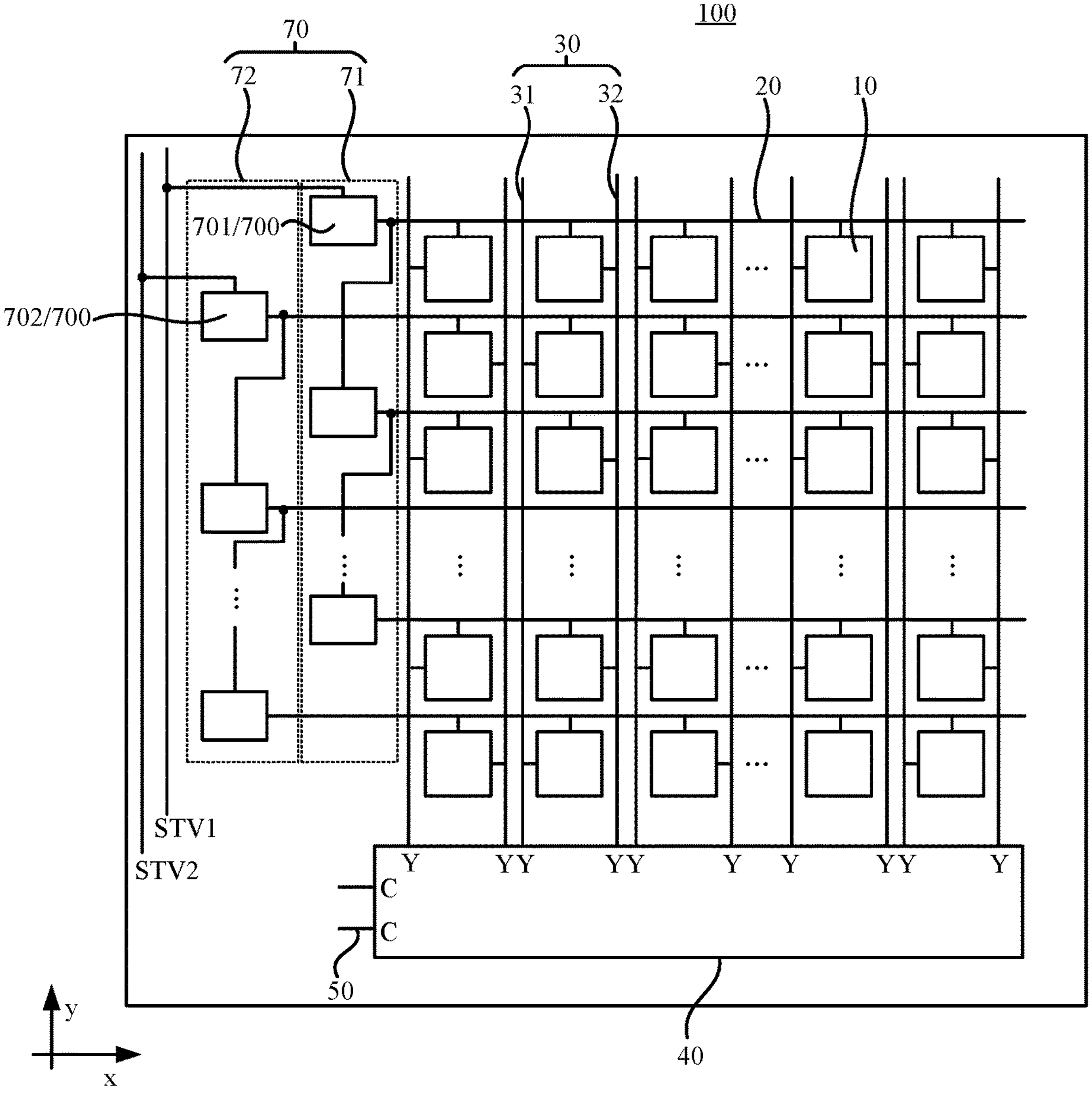
FIG. 20 is a schematic structural diagram of yet another display panel according to an embodiment of the present disclosure.

In an embodiment, FIG. 20 is a schematic structural diagram of yet another display panel according to an embodiment of the present disclosure, as shown in FIG. 20, the display panel 100 further includes a gate driving circuit 70, the gate driving circuit 70 includes a first driving sub-circuit 71 and a second driving sub-circuit 72, the first driving sub-circuit 71 and the second driving sub-circuit 72 each include multiple shift registers 700 being cascaded with each other, at least part of the multiple shift registers 700 are electrically connected to the multiple scan lines 20 and configured to provide scan signals to the multiple scan lines 20.

Where the first driving sub-circuit 71 and the second driving sub-circuit 72 may be located on two sides of the multiple pixel units 10 arranged in an array, or the first driving sub-circuit 71 and the second driving sub-circuit 72 may be located on a same side of the multiple pixel units 10, which is not limited in the embodiments of the present disclosure and may be set according to actual requirements.

In an embodiment, FIG. 20 shows that multiple cascaded shift registers 700 in the first driving sub-circuit 71 are electrically connected to first ends of part of the scan lines 20 to provide scan signals to the scan lines 20, and multiple cascaded shift registers 700 in the second driving sub-circuit 72 are electrically connected to first ends of remaining part of the scan lines 20 to provide scan signals to the scan lines 20. With continued reference to FIG. 20, in a same driving sub-circuit, a signal input terminal of a shift register 700 of a first stage receives a start pulse signal transmitted by a first start signal line STV1 or a second start signal line STV2, with the exception of the shift register 700 of the first stage, signal input terminals of remaining shift register 700 of each stage are electrically connected to signal output terminals of a shift register 700 of a previous stage, and enable signals of scan signals output by the signal output terminals of shift registers 700 of each stage are shifted in sequence. It should be noted that the first start signal line STV1 to which the first driving sub-circuit 71 is electrically connected and the second start signal line STV2 to which the second driving sub-circuit 72 is electrically connected may be a same start signal line or may be different start signal lines, which is not specifically limited in the embodiments of the present disclosure.

In an embodiment, with continued reference to FIG. 20, shift registers 700 in the first driving sub-circuit 71 are denoted as first shift registers 701, and shift registers 700 in the second driving sub-circuit 72 are denoted as second shift registers 702; in the second direction y, one second shift registers 702 is located between two adjacent first shift registers 701, and one first shift registers 701 is located between two adjacent second shift registers 702; and each of the first shift registers 701 is electrically connected to a (2k−1)-th scan line 20, and each of the second shift registers 702 is electrically connected to a 2k-th scan line 20, and k is a positive integer Specifically, the first shift register 701 is electrically connected to the scan line 20 electrically connected to the pixel units 10 of the odd-numbered rows, as such, an output terminal of a first shift register 701 of a first stage in the first driving sub-circuit 71 is electrically connected to an input terminal of a first shift register 701 of a third stage, an output terminal of the first shift register 701 of the third stage is electrically connected to an input terminal of a first shift register 701 of a fifth stage, and so on. The second shift register 702 is electrically connected to the scan line 20 electrically connected to the pixel units 10 of the odd-numbered rows, as such, an output terminal of a second shift register 702 of a first stage in the second driving sub-circuit 72 is electrically connected to an input terminal of a second shift register 702 of a fourth stage, an output terminal of the second shift register 702 of the fourth stage is electrically connected to an input terminal of a second shift register 702 of a sixth stage, and so on.

Thus, on the basis of any of the above embodiments, a width of an enable signal of a scan signal transmitted according to the (2k−1)-th scan line 20 is different from a width of an enable signal of a scan signal transmitted according to the 2k-th scan line 20, correspondingly, a start time and an end time at which signals are output by the first shift register 701 in the first driving sub-circuit 71 are different from a start time and an end time at which signals are output by the second shift register 702 in the second driving sub-circuit 72, so that the shift registers 700 of the each stage sequentially starts to output the enable signals of the scan signals and sequentially terminates to output the enable signals of the scan signals.

Figure 21:
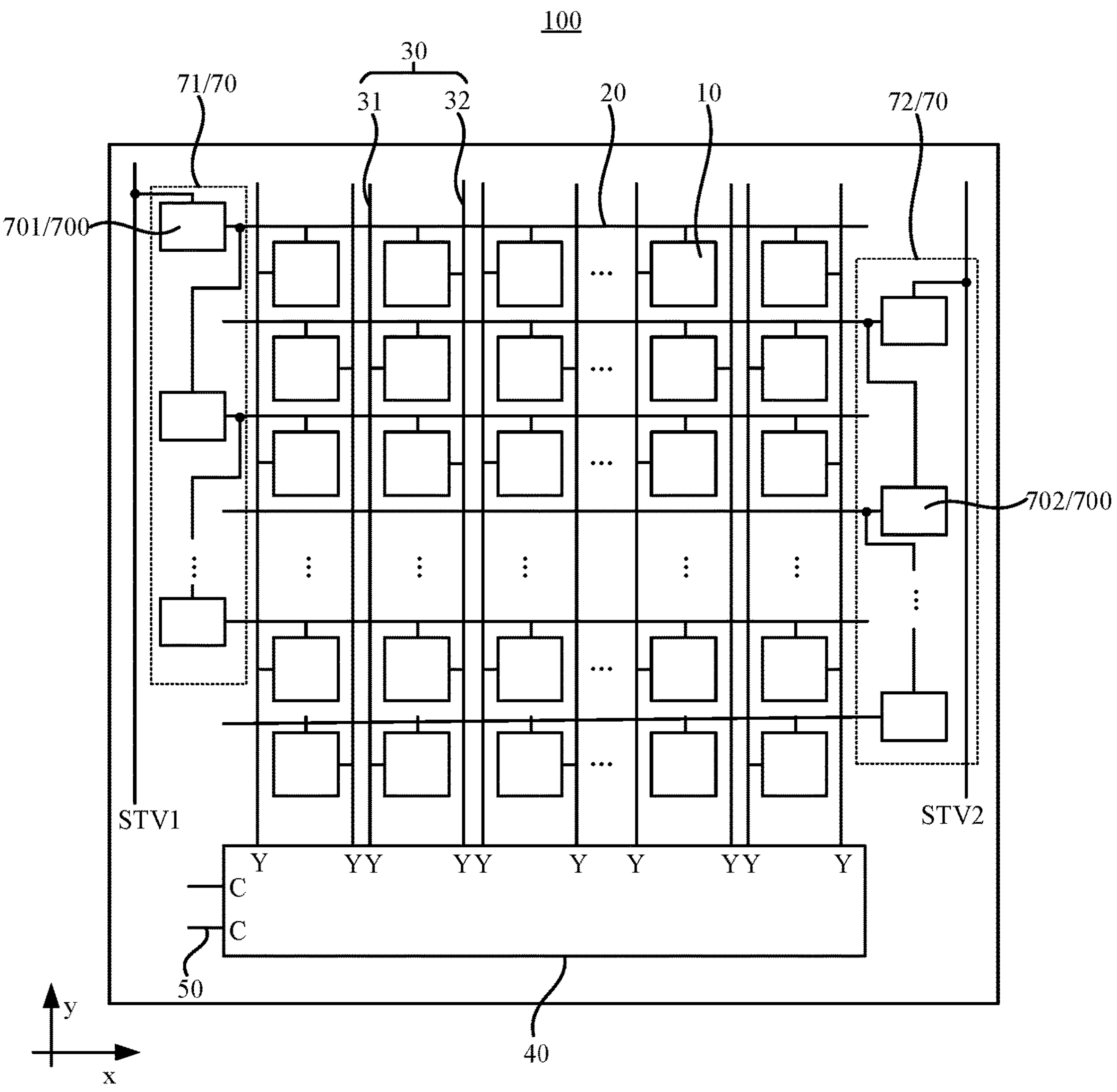
FIG. 21 is a schematic structural diagram of yet another display panel according to an embodiment of the present disclosure.

In another embodiment, FIG. 21 is a schematic structural diagram of yet another display panel according to an embodiment of the present disclosure, as shown in FIG. 21, shift registers 700 in a first driving sub-circuit 71 are denoted as first shift registers 701, and shift registers 700 in a second driving sub-circuit 72 are denoted as second shift registers 702, the first driving sub-circuit 71 and the second driving sub-circuit 72 are arranged in the first direction x, the first shift registers 700 in the first driving sub-circuit 71 are arranged in the second direction y, and the shift registers 700 in the second driving sub-circuit 72 are arranged in the second direction y. A first shift register 701 of an i-th stage is electrically connected to the i-th scan line 20, or a second shift register 702 of an i-th stage is electrically connected to the i-th scan line.

In an embodiment, FIG. 21 shows that multiple cascaded first shift registers 701 in the first driving sub-circuit 71 are respectively electrically connected to first ends of a (2k−1)-th scan line 20, multiple cascaded second shift registers 702 in the second driving sub-circuit 72 are respectively electrically connected to second ends of the 2k-th scan line 20, to implement the multiple cascaded first shift registers 701 in the first driving sub-circuit 71 to provide the (2k−1)-th scan signal to the (2k−1)-th scan line stage by stage, the multiple cascaded second shift registers 702 in the second driving sub-circuit 72 provide the 2k-th scan signal to the 2k-th scan line stage by stage, and a width of an enable duration of the (2k−1)-th scan signal and a width of an enable duration of the 2k-th scan signal may be the same or different, which is not specifically limited in the embodiments of the present disclosure and may be set according to actual requirements.

Figure 22:
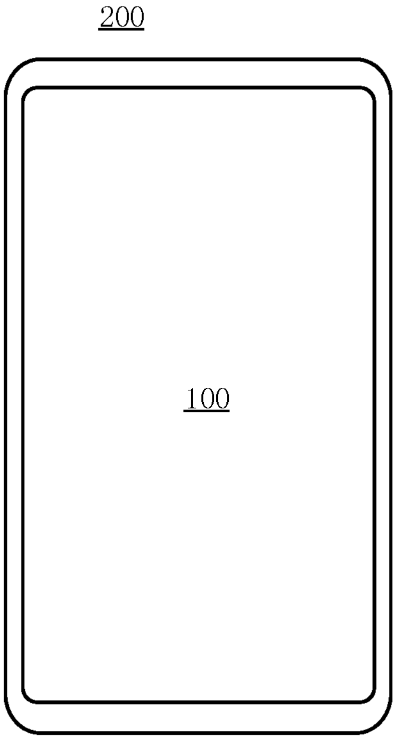
FIG. 22 is a schematic structural diagram of a display device according to an embodiment of the present disclosure.

Moreover, an embodiment of the present disclosure further provides a display device, FIG. 22 is a schematic structural diagram of a display device according to an embodiment of the present disclosure, as shown in FIG. 22, the display device 200 includes the display panel 100 provided in any one of the embodiments of the present disclosure, therefore, the display device 200 provided in the embodiments of the present disclosure includes technical features of the display panel 100 provided in the embodiments of the present disclosure, and the beneficial effects of the display panel 100 provided in the embodiments of the present disclosure may be achieved, for the same points, reference may be made to the above description of the display panel 100 provided in the embodiments of the present disclosure, which is not described in detail here. The display device 200 provided in the embodiments of the present disclosure may be a mobile phone or any electronic product having a display function, including but not limited to the following categories: a television, a laptop, a desktop display, a tablet computer, a digital camera, a smart bracelet, a smart glasses, a vehicular display, a medical apparatus, an industrial control apparatus, a touch interaction terminal, and the like, which is not particularly limited in the embodiments of the present disclosure.

It should be noted that the above are merely preferred embodiments of the present disclosure and the technical principles applied herein. It should be understood by those skilled in the art that the present disclosure is not limited to the particular embodiments described herein. For those skilled in the art, various apparent modifications, adaptations, combinations and substitutions may be made without departing from the scope of protection of the present disclosure. Therefore, although the present disclosure has been described in detail through the above embodiments, the present disclosure is not limited to the above embodiments and may include more other equivalent embodiments without departing from the concept of the present disclosure. The scope of the present disclosure is determined by the scope of the appended claims.

What is claimed is:

1. A display panel, comprising:

a plurality of pixel units;

a plurality of scan lines, wherein the plurality of scan lines comprise an i-th scan line, the i-th scan line is configured to transmit an i-th scan signal to pixel units arranged in a row along a first direction, the i-th scan signal comprises a first scan enable voltage edge and a second scan enable voltage edge in sequence, a time duration between the first scan enable voltage edge and the second scan enable voltage edge is an enable duration of the i-th scan signal, wherein i is a positive integer;

a plurality of data lines, wherein the plurality of data lines are configured to transmit data signals to pixel units arranged in a column along a second direction, and comprise first data lines and second data lines, the first data lines are electrically connected to pixel units of odd-numbered rows in a column of pixel units among the plurality of pixel units, the second data lines are electrically connected to pixel units of even-numbered rows in a column of pixel units among the plurality of pixel units, and the first direction intersects with the second direction;

a multiplexer, wherein the multiplexer comprises a plurality of selector output terminals and a plurality of selector control terminals, and each of the plurality of selector output terminals is electrically connected to a respective one of the plurality of data lines; and h control signal lines, wherein each of the h control signal lines is electrically connected to a respective one of the plurality of selector control terminals, and the h control signal lines comprise a j-th control signal line, the j-th control signal line is configured to transmit a j-th control signal, the j-th control signal comprises a first control enable voltage edge and a second control enable voltage edge in sequence, a time duration between the first control enable voltage edge and the second control enable voltage edge is an enable duration of the j-th control signal, wherein $1 \leq j \leq h$, and j and h are positive integers, wherein a drive timing of the display panel comprises a data write stage, and the data write stage comprises a first stage and a second stage, wherein in a same data write stage, during the first stage, the data signals are written into the plurality of data lines at the enable duration of the j-th control signal, during the second stage, the first scan enable voltage edge of the i-th scan signal is located behind the first control enable voltage edge of the j-th control signal, and the data signals on the plurality of data lines are written into the plurality of pixel units, and wherein the second scan enable voltage edge of the i-th scan signal in a m-th data write stage is located before a second control enable voltage edge of an n-th control signal in a (m+1)-th data write stage, wherein $|n-j| < h$, $1 \leq n \leq h$, and m and n are positive integers.

2. The display panel of claim 1, wherein during the first stage, the data signals are also written into the plurality of data lines at an enable duration of a (j+1)-th control signal, and during the second stage, the first scan enable voltage edge of the i-th scan signal is located behind a first control enable voltage edge of the (j+1)-th control signal.

3. The display panel of claim 2, wherein, the data signals are written into the first data lines at an enable duration of a first control signal and an enable duration of a second control signal in the data write stage of a (2k+1)-th row of pixel units among the plurality of pixel units, and k is a positive integer;

the data signals are written into the second data lines at an enable duration of a third control signal and an enable duration of a fourth control signal in the data write stage of a 2k-th row of pixel units; and a second scan enable voltage edge of a (2k+1)-th scan signal in the m-th data write stage is located before a second control enable voltage edge of the fourth control signal in the (m+1)-th data write stage.

4. The display panel of claim 3, wherein the second scan enable voltage edge of the (2k+1)-th scan signal in the m-th data write stage is located before a first control enable voltage edge of the fourth control signal in the (m+1)-th data write stage.

5. The display panel of claim 4, wherein the second scan enable voltage edge of the (2k+1)-th scan signal in the m-th data write stage is located before a second control enable voltage edge of the third control signal in the (m+1)-th data write stage.

6. The display panel of claim 5, wherein the second scan enable voltage edge of the (2k+1)-th scan signal in the m-th data write stage is located before a first control enable voltage edge of the third control signal in the (m+1)-th data write stage.

7. The display panel of claim 3, wherein a second scan enable voltage edge of a 2k-th scan signal in the m-th data write stage is located before a first control enable voltage edge of the second control signal in the (m+1)-th data write stage, wherein the second scan enable voltage edge of the 2k-th scan signal in the m-th data write stage is located before a second control enable voltage edge of the first control signal in the (m+1)-th data write stage, or wherein the second scan enable voltage edge of the 2k-th scan signal in the m-th data write stage is located before a first control enable voltage edge of the first control signal in the (m+1)-th data write stage.

8. The display panel of claim 3, wherein a second scan enable voltage edge of a (2k−1)-th scan signal in the m-th data write stage is located before a first control enable voltage edge of the first control signal in a (m+2)-th data write stage.

9. The display panel of claim 3, wherein a first scan enable voltage edge of a (2k+2)-th scan signal in the m-th data write stage is located behind the second control enable voltage edge of the fourth control signal in the m-th data write stage.

10. The display panel of claim 1, further comprising a gate driving circuit, wherein the gate driving circuit comprises a first driving sub-circuit and a second driving sub-circuit, the first driving sub-circuit and the second driving sub-circuit each comprise a plurality of shift registers being cascaded with each other, at least part of the plurality of shift registers are electrically connected to the plurality of scan lines and configured to provide scan signals to the plurality of scan lines.

11. The display panel of claim 10, wherein shift registers in the first driving sub-circuit are denoted as first shift registers, and shift registers in the second driving sub-circuit are denoted as second shift registers;

in the second direction, one of the second shift registers is located between two adjacent first shift registers, and one of the first shift registers is located between two adjacent second shift registers; and each of the first shift registers is electrically connected to a (2k−1)-th scan line of the plurality of scan lines, and each of the second shift registers is electrically connected to a 2k-th scan line of the plurality of scan lines, and k is a positive integer.

12. The display panel of claim 10, wherein shift registers in the first driving sub-circuit are denoted as first shift registers, and shift registers in the second driving sub-circuit are denoted as second shift registers;

the first driving sub-circuit and the second driving sub-circuit are arranged in the first direction, the first shift registers in the first driving sub-circuit are arranged in the second direction, and the second shift registers in the second driving sub-circuit are arranged in the second direction; and a first shift register in an i-th stage is electrically connected to the i-th scan line, or a second shift register in an i-th stage is electrically connected to the i-th scan line.

13. The display panel of claim 1, wherein, the data signals are written into the first data lines at an enable duration of a first control signal in the data write stage of a (2k+1)-th row of pixel units among the plurality of pixel units, and k is a positive integer, the data signals are written into the second data lines at an enable duration of a second control signal in the data write stage of a 2k-th row of pixel units among the plurality of pixel units, and a second scan enable voltage edge of a (2k+1)-th scan signal in the m-th data write stage is located before a second control enable voltage edge of the second control signal in the (m+1)-th data write stage.

14. The display panel of claim 10, wherein the second scan enable voltage edge of the (2k+1)-th scan signal in the m-th data write stage is located before a first control enable voltage edge of the second control signal in the (m+1)-th data write stage, wherein a second scan enable voltage edge of a 2k-th scan signal in the m-th data write stage is located before a first control enable voltage edge of the first control signal in the (m+1)-th data write stage.

15. The display panel of claim 1, wherein all scan signals have enable durations with a same width.

16. The display panel of claim 1, further comprising a source signal line, wherein, the multiplexer comprises h switch transistors, wherein first poles of the h switch transistors are connected to a same source signal line;

a second pole of each of the h switch transistors is connected to one of the first data lines or one of the second data lines; and gates of the h switch transistors are electrically connected to the h control signal lines in one-to-one correspondence, wherein the h switch transistors comprise a first switch transistor, a second switch transistor, a third switch transistor, and a fourth switch transistor; and wherein a second pole of the first switch transistor and a second pole of the second switch transistor are respectively connected to a respective one of two first data lines among the first data lines, and a second pole of the third switch transistor and a second pole of the fourth switch transistor are respectively connected to a respective one of two second data lines among the second data lines.

17. The display panel of claim 1, wherein the plurality of the data lines are arranged in the first direction;

wherein two of the first data lines or two of the second data lines are located between two adjacent columns of pixel units among the plurality of pixel units in the first direction.

18. The display panel of claim 1, wherein the plurality of the data lines are arranged in the first direction;

wherein one of the first data lines and one of the second data lines are located between two adjacent columns of pixel units among the plurality of pixel units in the first direction.

19. The display panel of claim 1, wherein the plurality of pixel units are arranged in an array along the first direction and the second direction, and the plurality of pixel units comprise first pixel columns and second pixel columns;

in the first direction, one of the second pixel columns is located between two of the first pixel columns, and one of the first pixel columns is located between two of the second pixel columns;

the first pixel columns comprise a first pixel unit and a second pixel unit disposed at one-to-one interval in the second direction, and the second pixel columns comprises third pixel units arranged in the second direction; and two pixel units of the first pixel unit, the second pixel unit, and the third pixel unit have different light-emitting colors.

20. A display device, comprising a display panel, wherein the display panel comprises:

a plurality of pixel units;

a plurality of scan lines, wherein the plurality of scan lines comprise an i-th scan line, the i-th scan line is configured to transmit an i-th scan signal to pixel units arranged in a row along a first direction, the i-th scan signal comprises a first scan enable voltage edge and a second scan enable voltage edge in sequence, a time duration between the first scan enable voltage edge and the second scan enable voltage edge is an enable duration of the i-th scan signal, wherein i is a positive integer;

a plurality of data lines, wherein the plurality of data lines are configured to transmit data signals to pixel units arranged in a column along a second direction, and comprise first data lines and second data lines, the first data lines are electrically connected to pixel units of odd-numbered rows in a column of pixel units among the plurality of pixel units, the second data lines are electrically connected to pixel units of even-numbered rows in a column of pixel units among the plurality of pixel units, and the first direction intersects with the second direction;

a multiplexer, wherein the multiplexer comprises a plurality of selector output terminals and a plurality of selector control terminals, and each of the plurality of selector output terminals is electrically connected to a respective one of the plurality of data lines; and h control signal lines, wherein each of the h control signal lines is electrically connected to a respective one of the plurality of selector control terminals, and the h control signal lines comprise a j-th control signal line, the j-th control signal line is configured to transmit a j-th control signal, the j-th control signal comprises a first control enable voltage edge and a second control enable voltage edge in sequence, a time duration between the first control enable voltage edge and the second control enable voltage edge is an enable duration of the j-th control signal, wherein $1 \leq j \leq h$, and j and h are positive integers, wherein a drive timing of the display panel comprises a data write stage, and the data write stage comprises a first stage and a second stage, wherein in a same data write stage, during the first stage, the data signals are written into the plurality of data lines at the enable duration of the j-th control signal, during the second stage, the first scan enable voltage edge of the i-th scan signal is located behind the first control enable voltage edge of the j-th control signal, and the data signals on the plurality of data lines are written into the plurality of pixel units, and wherein the second scan enable voltage edge of the i-th scan signal in a m-th data write stage is located before a second control enable voltage edge of an n-th control signal in a (m+1)-th data write stage, wherein $|n-j|<h$, $1 \leq n \leq h$, and m and n are positive integers.

* * * * *